(12) United States Patent
Kirkwood et al.

(10) Patent No.: US 7,175,557 B2
(45) Date of Patent: *Feb. 13, 2007

(54) TORQUE VECTORING DEVICE HAVING AN ELECTRIC MOTOR/BRAKE ACTUATOR AND FRICTION CLUTCH

(75) Inventors: Malcolm E. Kirkwood, Livonia, MI (US); Thomas C. Bowen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 10/999,859

(22) Filed: Nov. 30, 2004

(65) Prior Publication Data

US 2006/0199697 A1    Sep. 7, 2006

Related U.S. Application Data

(63) Continuation-in-part of application No. 10/973,071, filed on Oct. 25, 2004, now Pat. No. 6,945,375, which is a continuation of application No. 10/371,415, filed on Feb. 21, 2003, now Pat. No. 6,808,053.

(51) Int. Cl.
*F16H 48/30* (2006.01)
*F16H 37/08* (2006.01)

(52) U.S. Cl. .................. 475/150; 475/204; 475/225

(58) Field of Classification Search ............... 475/150, 475/200, 201, 204, 223, 225, 249
See application file for complete search history.

(56) References Cited

U.S. PATENT DOCUMENTS

| 4,691,593 A | 9/1987 | Mueller |
| 4,757,728 A | 7/1988 | Pitsch |
| 4,763,747 A | 8/1988 | Muller |
| 5,199,325 A * | 4/1993 | Reuter et al. ............... 74/335 |
| 5,370,588 A | 12/1994 | Sawase et al. |
| 5,415,598 A | 5/1995 | Sawase et al. |
| 5,456,641 A | 10/1995 | Sawase |
| 5,632,185 A | 5/1997 | Gassmann |
| 5,699,888 A | 12/1997 | Showalter |

(Continued)

FOREIGN PATENT DOCUMENTS

DE    3908478 A1    5/1989

(Continued)

*Primary Examiner*—Richard M. Lorence
(74) *Attorney, Agent, or Firm*—Harness, Dickey & Pierce, P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a clutch actuator assembly for generating and applying a clutch engagement force on the clutch assembly. The clutch actuator assembly includes an electric motor/brake unit and a torque/force conversion mechanism. The motor/brake unit can be operated in either of a motor mode or a brake mode to cause bi-directional linear movement of an output member of the torque/force conversion mechanism. The thrust force generated by the torque/force conversion mechanism is applied to the clutch assembly. The dual mode feature of the electric motor/brake unit significantly reduces the power requirements. A torque vectoring drive axle is equipped with a pair of such torque transfer mechanisms.

40 Claims, 19 Drawing Sheets

U.S. PATENT DOCUMENTS

| | | |
|---|---|---|
| 5,904,634 A | 5/1999 | Teraoka |
| 5,910,064 A | 6/1999 | Kuroki |
| 5,911,291 A | 6/1999 | Suetake et al. |
| 6,120,407 A | 9/2000 | Mimura |
| 6,213,241 B1 | 4/2001 | Kita et al. |
| 6,378,677 B1 | 4/2002 | Kuroda et al. |
| 6,394,246 B1 | 5/2002 | Gassmann et al. |
| 6,520,880 B1 | 2/2003 | Fukushima et al. |
| 6,533,090 B2 | 3/2003 | Osborn et al. |
| 6,616,566 B2 | 9/2003 | Gorlich |
| 6,645,108 B1 | 11/2003 | Gradu |
| 6,808,053 B2 * | 10/2004 | Kirkwood et al. .......... 192/84.6 |
| 7,086,982 B2 * | 8/2006 | Bowen ....................... 475/225 |

FOREIGN PATENT DOCUMENTS

| | | |
|---|---|---|
| JP | 62-18117 | 1/1987 |
| JP | 3-66927 | 3/1991 |
| WO | WO 02/09966 A1 | 2/2002 |

* cited by examiner

TORQUE VECTORING DEVICE HAVING AN ELECTRIC MOTOR/BRAKE ACTUATOR AND FRICTION CLUTCH

CROSS-REFERENCE TO RELATED APPLICATIONS

This application is a continuation-in-part of U.S. Ser. No. 10/973,071 filed Oct. 25, 2004 now U.S. Pat. No. 6,945,375, which is a continuation of U.S. Ser. No. 10/371,415 filed Feb. 21, 2003, now U.S. Pat. No. 6,808,053 issued Oct. 26, 2004.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a pair of torque transfer mechanisms which are each equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions.

A large number of on-demand transfer clutches have been developed with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. In addition, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch assembly.

To further enhance the tractive and stability characteristics of four-wheel drive vehicles, it is known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control as is disclosed, for example, in U.S. Pat. Nos. 6,378,677 and 5,699,888. As an alternative, a hydraulically-operated traction distribution axle assembly is shown in U.S. Pat. No. 6,520,880. Additional traction distributing axle assemblies are disclosed in U.S. Pat. Nos. 5,370,588 and 6,213,241.

While many on-demand clutch control systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to a further object of the present invention, the torque transfer mechanism and control system are used for adaptively controlling the transfer of drive torque between a first rotary member and a second rotary member in a power transmission devices of the type used in motor vehicle driveline applications. The torque transfer mechanism includes a multi-plate friction clutch assembly operably disposed between the first and second rotary members, and a clutch actuator assembly for generating a clutch engagement force to be exerted on the clutch assembly. The clutch actuator assembly preferably includes an electric motor/brake unit, a torque/force conversion mechanism and a force amplification mechanism. The electric motor/brake unit can be switched by the control system between a motor (i.e., torque producing) mode and a brake (i.e., torque absorbing) mode for generating an output torque that is converted by the torque/force conversion mechanism into an axially-directed thrust force. Thereafter, thrust force is amplified by the force amplification mechanism to define the clutch engagement force.

According to another object of the present invention, the control system operates the motor/brake unit in its motor mode when the speed of one of the rotary members is less than a predetermined threshold speed value so as to drive a rotor of the motor/brake unit which causes axial movement of an output member of the torque/force conversion mechanism. The control system switches the motor/brake unit into its brake mode when the rotary speed exceeds the threshold speed value so as to apply a dynamic brake torque to the rotor for controlling axial movement of the output member of the torque/force conversion mechanism. The present invention provides a clutch actuator assembly utilizing a low torque motor which acts as a generator during the brake mode so as to significantly reduce the electrical power requirement needed to adaptively control torque transfer through the clutch assembly.

The torque transfer mechanism of the present invention is adapted for use in a power transmission device for adaptively controlling the drive torque transferred between a primary driveline and a secondary driveline. According to one preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary drivelines. According to another preferred application, the power transmission device is a drive axle assembly with the torque transfer mechanism arranged as a torque bias coupling to control speed differentiation and torque distribution across a differential unit.

In accordance with another feature of the present invention, the control system is provided for use in driveline applications equipped with two or more torque couplings that are operable to control coordinated actuation of each electric motor/brake unit. In particular, switching each of the motor/brake units between operation in their motor and brake modes permits regenerated electrical power to be used, thereby significantly reducing the electrical power requirements from the vehicle's host system.

As a related object of the present invention, a drive axle assembly having a torque distributing drive mechanism and an active yaw control system are disclosed. The torque distributing drive mechanism includes a differential and first and second electric motor/brake units. The differential functions to transfer drive torque from the vehicle's powertrain to first and second axleshafts while permitting speed differentiation therebetween. The first motor/brake unit is operable for selectively increasing or decreasing the rotary speed of the first axleshaft while the second motor/brake unit is similarly arranged for selectively increasing or decreasing the rotary speed of the second axleshaft. Accordingly, selective control over actuation of one or both of the motor/brake units provides adaptive control of the speed differentiation and drive torque transferred between the first and second axleshafts. The active yaw control system includes sensors for detecting a vehicle yaw condition and a controller for switching the motor/brake units between their motor and brake modes to adaptively vary the rotary speed of one or both axleshafts to counteract the yaw condition.

In accordance with another embodiment, the torque distributing drive mechanism includes a differential, a speed changing unit, and first and second torque couplings that are operable to selectively vary the rotary speed of one axleshaft so as to cause corresponding variation in the rotary speed of the other axleshaft. Each torque coupling includes a multi-plate friction clutch and a clutch actuator assembly having an electric motor/brake unit.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to torque transfer mechanisms that can be adaptively controlled for modulating the torque transferred between first and second rotary members. The torque transfer mechanism finds particular application in power transmission devices for use in motor vehicle drivelines such as, for example, an on-demand transfer clutch in a transfer case or an in-line torque coupling, a biasing clutch associated with a differential assembly in a transfer case or a drive axle assembly, or as a shift clutch in a multi-speed automatic transmission. Thus, while the present invention is hereinafter described in association with particular power transmission devices for use in specific driveline applications, it will be understood that the arrangements shown and described are merely intended to illustrate embodiments of the present invention.

Figure 1:
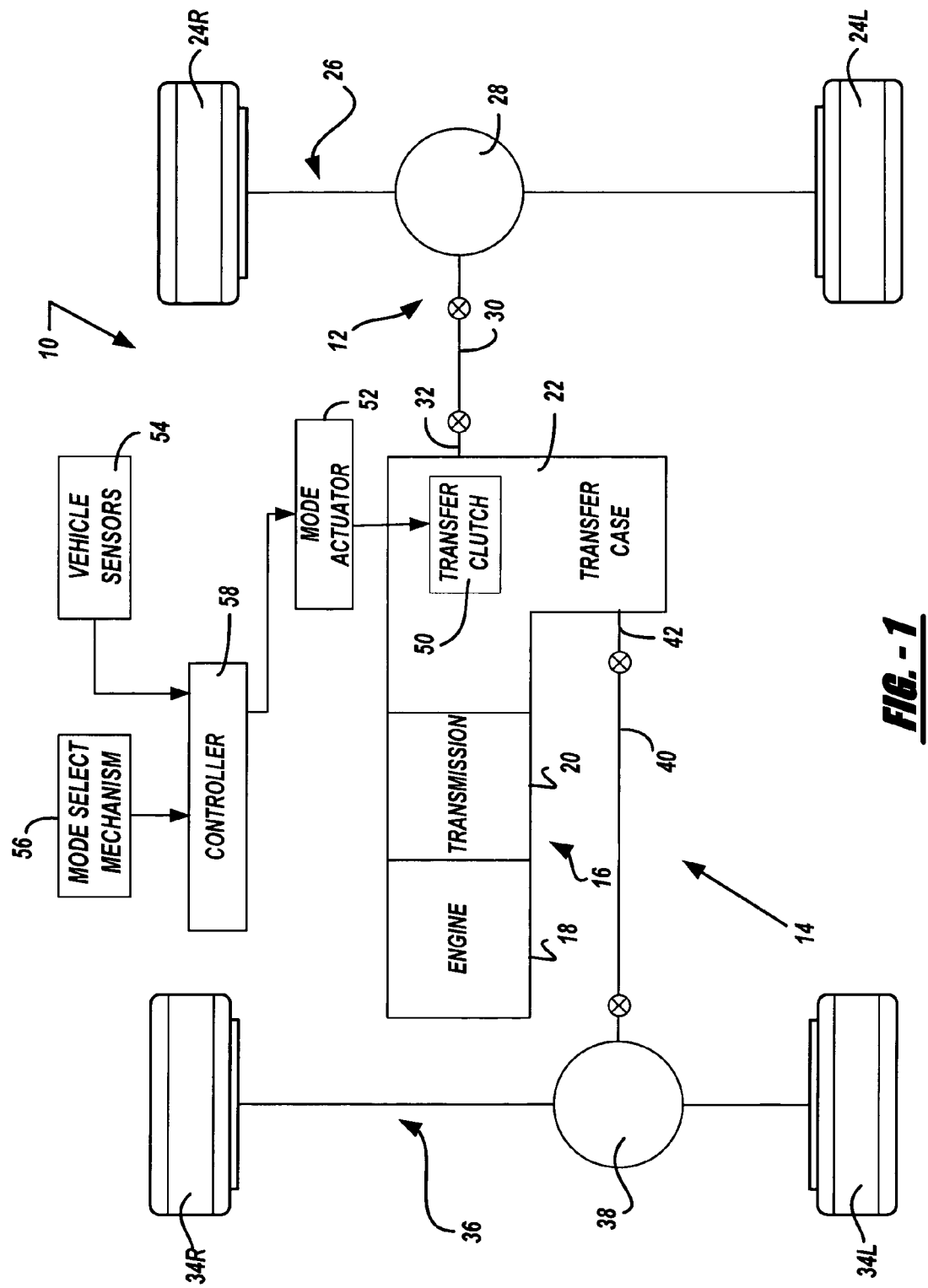
FIG. 1 illustrates the drivetrain of a four-wheel drive vehicle equipped with the power transmission device of the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24L and 24R connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34L and 34R connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
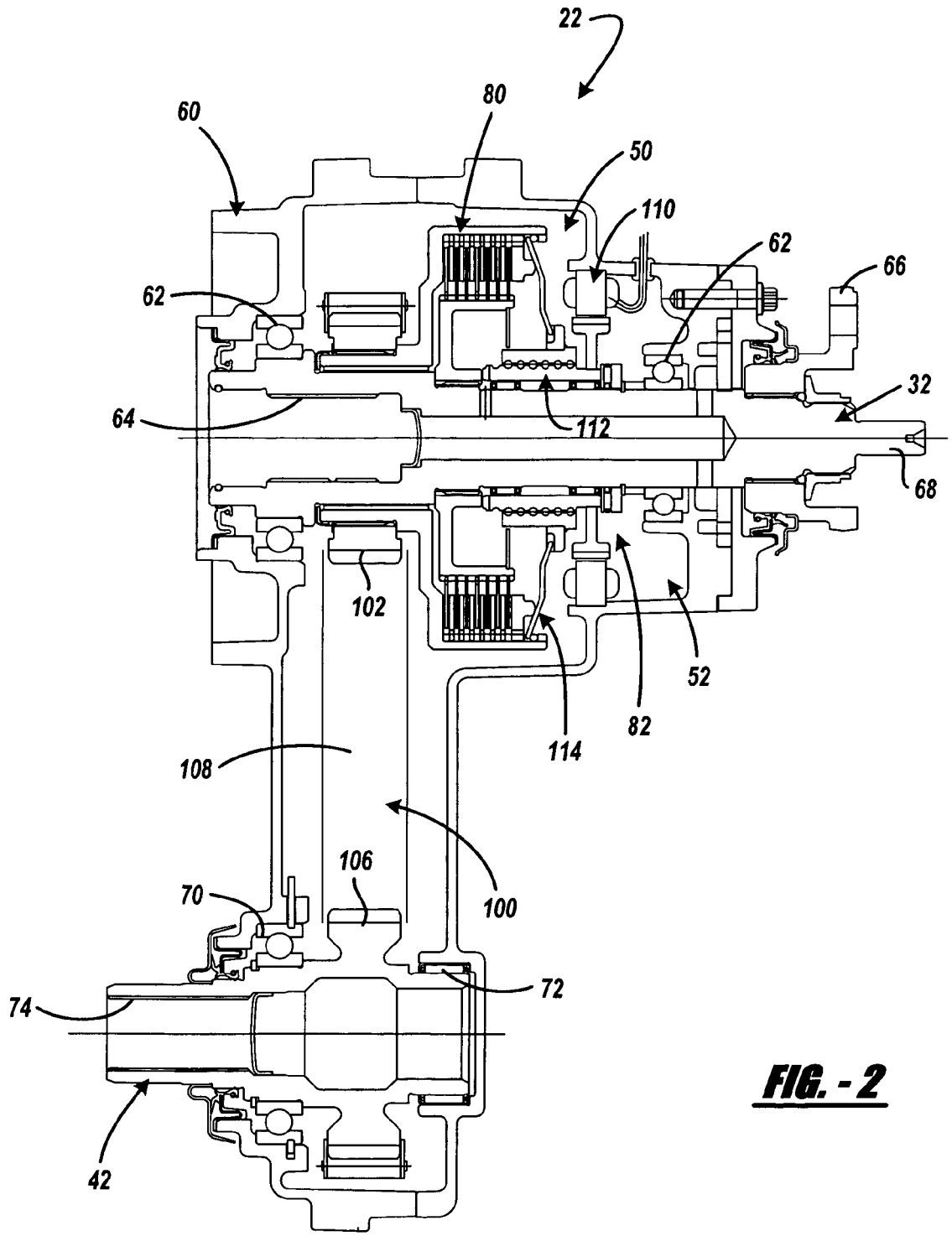
FIG. 2 is a sectional view of a transfer case associated with the drivetrain shown in FIG. 1 and which is equipped with a torque transfer mechanism according to a first embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and 72 and includes an internally-splined end segment 74 that is adapted for connection to front propshaft 40.

Transfer clutch 50 is a multi-plate friction clutch assembly 80 and mode actuator 52 is a power-operated clutch actuator assembly 82 which together define a torque transfer mechanism according to a preferred embodiment of the present invention. Friction clutch assembly 80 includes a hub 84 fixed via a spline connection 86 to rear output shaft 32, a drum 88, and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. Clutch assembly 80 further includes a pressure plate 96 that is splined for rotation with drum 88 and which has an annular rim flange 98 formed thereon. Pressure plate 96 is operably arranged to rotate with, and move axially relative to, drum 88 for exerting a compressive clutch engagement force on clutch pack 90. Such engagement of clutch pack 90 causes rotary power ("drive torque") to be transferred from rear output shaft 32 to front output shaft 42 via a transfer assembly 100. Transfer assembly 100 includes a first sprocket 102 fixed via a spline connection 104 for rotation with drum 88, a second sprocket 106 fixed for rotation with front output shaft 42, and a power chain 108 encircling sprockets 102 and 106. First sprocket 102 is shown fixed to a tubular stub shaft segment 89 of drum 88 which is rotatably supported on rear output shaft 32 via a suitable bearing assembly such as sleeve bushing 109.

As will be detailed, clutch actuator assembly 82 is operable for controlling axial movement of pressure plate 96 and thus, the magnitude of the clutch engagement force applied to clutch pack 90. In particular, pressure plate 96 is axially moveable relative to clutch pack 90 between a first or "released" position and a second or "locked" position. With pressure plate 96 in its released position, a minimum clutch engagement force is exerted on clutch pack 90 such that virtually no drive torque is transferred from rear output shaft 32 through clutch assembly 80 and transfer assembly 100 to front output shaft 42, thereby establishing the two-wheel drive mode. In contrast, movement of pressure plate 96 to its locked position causes a maximum clutch engagement force to be applied to clutch pack 90 such that front output shaft 42 is, in effect, coupled for common rotation with rear output shaft 32, thereby establishing the part-time four-wheel drive mode. Accordingly, control of the position of pressure plate 96 between its released and locked positions permits adaptive regulation of the amount of drive torque transferred from rear output shaft 32 to front output shaft 42, thereby establishing the on-demand four-wheel drive mode.

To provide means for moving pressure plate 96 between its released and locked positions, clutch actuator assembly 82 is shown to generally include an electric motor/brake unit 110, a torque/force conversion mechanism 112, and force amplification mechanism 114. Motor/brake unit 110 is an annular assembly which includes a stator 116 and a rotor 120. Stator 116 is shown to be non-rotationally secured to housing 60 and includes sets of windings, referred to as coil 118, which has its electrical lead wires 122 extending out of housing 60 via a sealed plug hole 124. Rotor 120 includes a plate segment 126 and an annular rim segment 128. As will be detailed, plate segment 126 of rotor 120 is fixed for rotation with a first component of torque/force conversion mechanism 112. As seen, rim segment 128 of rotor 120 has a plurality of permanent magnets 130 secured thereto which are arranged in close proximity to the field windings of coil 118. The annular configuration of motor/brake unit 110 permits simple assembly in concentric relation to rear output shaft 32 within housing 60. In addition, the packaging of motor/brake unit 110 inside housing 60 is advantageous in comparison to externally-mounted electric motor-type clutch actuators that are exposed to the hostile road and weather conditions associated with power transmission devices in motor vehicles.

Figure 3:
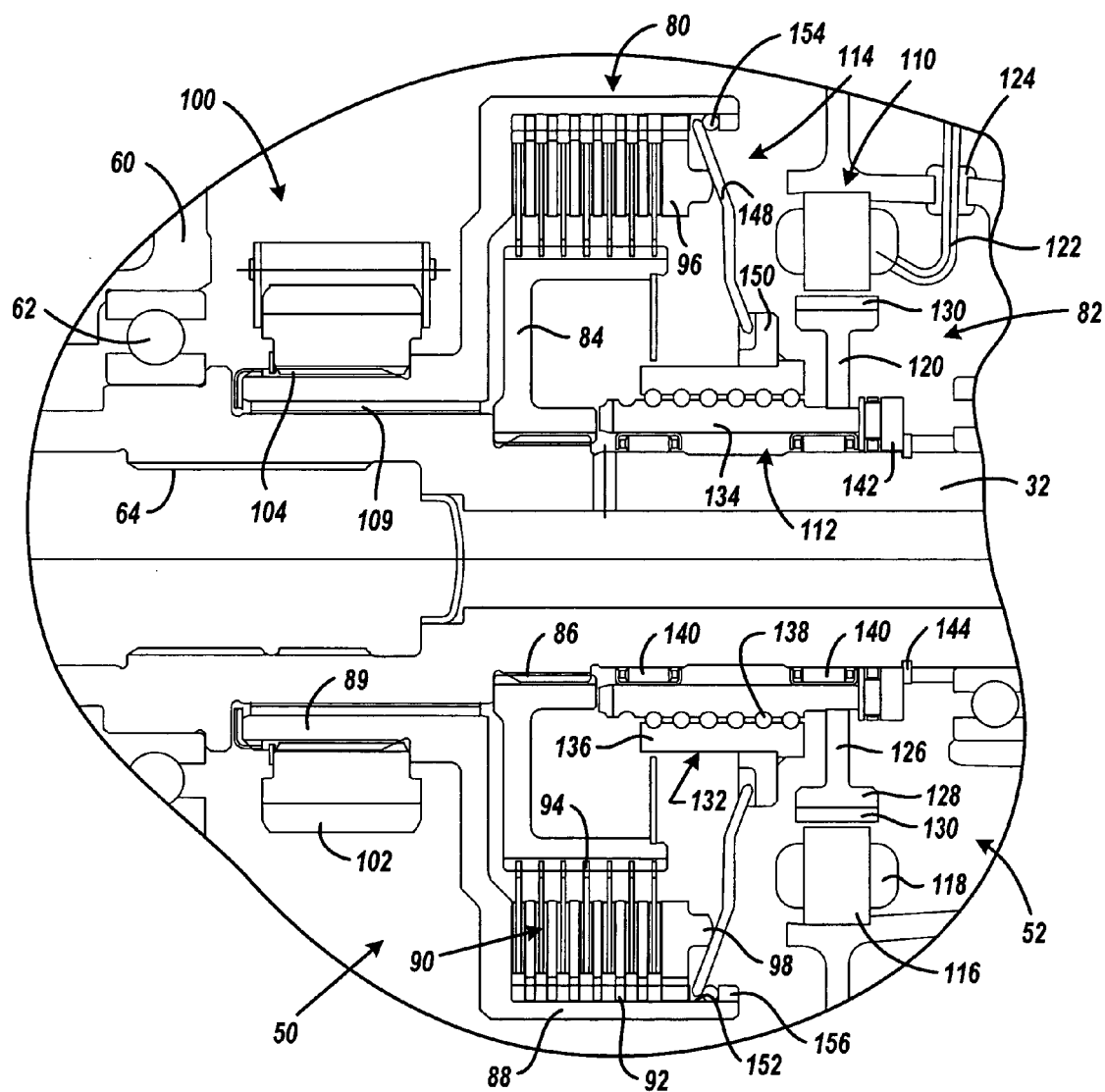
FIG. 3 is an enlarged partial view taken from FIG. 2 showing components of the torque transfer mechanism is greater detail.

Torque/force conversion mechanism 112 is shown in FIGS. 2 and 3 as a ball screw operator 132 having an externally-threaded screw 134, an internally-threaded nut 136, and balls 138 disposed in the aligned threads therebetween. Screw 134 is rotatably supported on rear output shaft 32 via a pair of needle bearing assemblies 140. Screw 134 is located and axially restrained between hub 84 and a thrust bearing assembly 142 via a snap ring 144. As seen, plate segment 126 of rotor 120 is fixed (i.e., welded, splined, etc.) for rotation with screw 134. Ball screw operator 132 is operable to cause axial movement of nut 136 relative to screw 134 in response to relative rotation therebetween. In this manner, the torque outputted from motor/brake unit 110 is converted into an axially-directed thrust force. This axially-directed thrust force is amplified and subsequently transferred to pressure plate 96 via force amplification mechanism 114. In some clutch applications, it may be possible to eliminate force amplification mechanism 114 and apply the thrust force outputted from ball screw operator 132 directly to pressure plate 96. Furthermore, it should be understood that ball screw operator 132 is merely one example of an applicable device for torque/force conversion mechanism 112 and that other devices capable of converting rotary motion into a linear force (i.e., ballramp units, cam plates, etc.) should be considered equivalent to that disclosed.

Force amplification mechanism 114 is shown to include a disk-type spring plate, such as a belleville spring 148, having a first end restrained against an annular retainer 150 fixed to nut 136 and a second end restrained in a circumferential groove 152 formed in drum 88. Preferably, belleville spring 148 has lugs at its outer peripheral edge that are coupled to drum 88 and lugs at its inner peripheral edge that are coupled to retainer 150. As such, belleville spring 148 couples nut 136 of ball screw operator 132 for common rotation with drum 88. In operation, when no torque is applied to rotor 120, screw 134 and nut 136 rotate together in response to rotation of drum 88.

To provide the desired force amplification characteristic, belleville spring 148 acts as a lever arm with an intermediate portion engaging rim flange 98 on pressure plate 96. A resilient ring 154 is retained in groove 152 between the outer end of belleville spring 148 and a reaction flange 156 that extends from drum 88. As is known, forward travel (i.e., to the left in FIG. 3) of nut 136 causes spring 148 to amplify the magnitude of the longitudinally-directed thrust force generated by ball screw operator 132 and apply the resultant clutch engagement force on pressure plate 96. The use of ball screw operator 132 in combination with disk spring 148 permits use of a low torque motor/brake unit 110. In operation, motor/brake unit 110 will be controlled in either of a first ("motor") mode or a second ("brake") mode for controlling the torque applied to rotor 120 so as to control relative rotation between screw 134 and nut 136, thereby controlling the magnitude of the clutch engagement force applied by pressure plate 96 on clutch pack 90.

Compared to conventional electrically-operated clutch actuator systems, the present invention provides significant operational advantages. For instance, clutch actuator assembly 82 requires only minimal electric power from the vehicle's host electrical supply system since, throughout most of its typical duty cycle, motor/brake unit 110 functions in its brake mode and acts as an absorber/generator for generating electrical power that can be dissipated or used to power one or more auxiliary electric devices such as, for example, an electric lube pump. Specifically, when the rotary speed of rear output shaft 32 is below a predefined threshold value, motor/brake unit 110 operates in its motor mode wherein coil 118 must be energized via an electrical control signal from controller 58 to drive rotor 120 in the appropriate rotary direction and through a desired amount of angular travel. Such controlled rotation of rotor 120 causes nut 136 of ball screw operator 132 to move axially relative to screw 134 in a corresponding direction and through a desired length of travel, thereby varying the magnitude of the clutch engagement force applied to clutch pack 90. The predefined threshold rotary speed value is preferably, but not limited to, about 150 rpm which equates to a vehicle rolling speed of about 5 mph. Thus, the torque transfer mechanism of the present invention only uses motor/brake unit 110 in its motor mode to control torque transfer requirements during low speed situations. For example, motor/brake unit 110 operates in its motor mode to control the transfer of drive torque to front output shaft 42 during a quick start or acceleration situation to avoid traction loss of rear wheels 24.

Once the rotary speed of rear output shaft 32 exceeds the predefined threshold value, the control system switches functions such that motor/brake unit 110 operates in its brake mode as an electric brake (absorber/generator) for creating (regenerating) electric power. In particular, when the rotary speed of rear output shaft 32 is above the threshold value, rotation of rotor 120 (caused by rotation of ball screw operator 132) causes magnets 130 to generate a voltage in the field windings of coil 118. However, since coil 118 is not energized, no torque is applied to rotor 120. As such, ball screw operator 132 continues to rotate as a unit and nut 136 does not move axially in either direction. Upon energization of coil 118, a brake torque is generated which acts to slow rotation of rotor 120 and thus slow rotation of screw 134 relative to nut 136, thereby causing axial travel of nut 136 relative to clutch pack 90. With motor/brake unit 110 operating in the brake mode, the control system functions to maintain a predetermined torque on ball screw operator 132 which, in turn, acts to control engagement of clutch pack 90 so as to generate the desired amount of torque transfer to front output shaft 42. Preferably, motor/brake unit 110 is a dc pemanetic magnetic device since it will not require a commutator or brushes.

In operation, when mode selector 56 indicates selection of the two-wheel drive mode, controller 58 signals electric motor/brake unit 110 to rotate screw 134 until nut 136 is located in a rearward or "retracted" position. Such action permits pressure plate 96 to move to its released position. If mode selector 56 thereafter indicates selection of the part-time four-wheel drive mode, coil 118 of electric motor/brake unit 110 is signaled by controller 58 to rotate screw 134 for axially advancing nut 136 until it is located in a forward or "extended" position. Such movement of nut 136 to its extended position acts to cause corresponding movement of pressure plate 96 to its locked position, thereby coupling front output shaft 42 to rear output shaft 32 through clutch assembly 80 and transfer assembly 100.

When mode selector 56 indicates selection of the on-demand four-wheel drive mode, controller 58 signals motor/brake unit 110 to rotate screw 134 until nut 136 is located in a "stand-by" position. This stand-by position may be its retracted position or, in the alternative, an intermediate position. In either case, a predetermined minimum amount of drive torque is delivered to front output shaft 42 through clutch assembly 80 which is considered to be in its "ready" condition. Thereafter, controller 58 determines when and how much drive torque needs to be transferred to front output shaft 42 based on the current tractive conditions and/or operating characteristics of the motor vehicle, as detected by sensors 54. Many control schemes are known in the art for determining a desired torque level to be transferred through a transfer clutch and adaptively controlling such actuation of the transfer clutch. In this regard, commonly owned U.S. Pat. No. 5,323,871 discloses a non-limiting example of a clutch control scheme and the various sensors used therewith, the entire disclosure of which is incorporated by reference.

Figure 4:
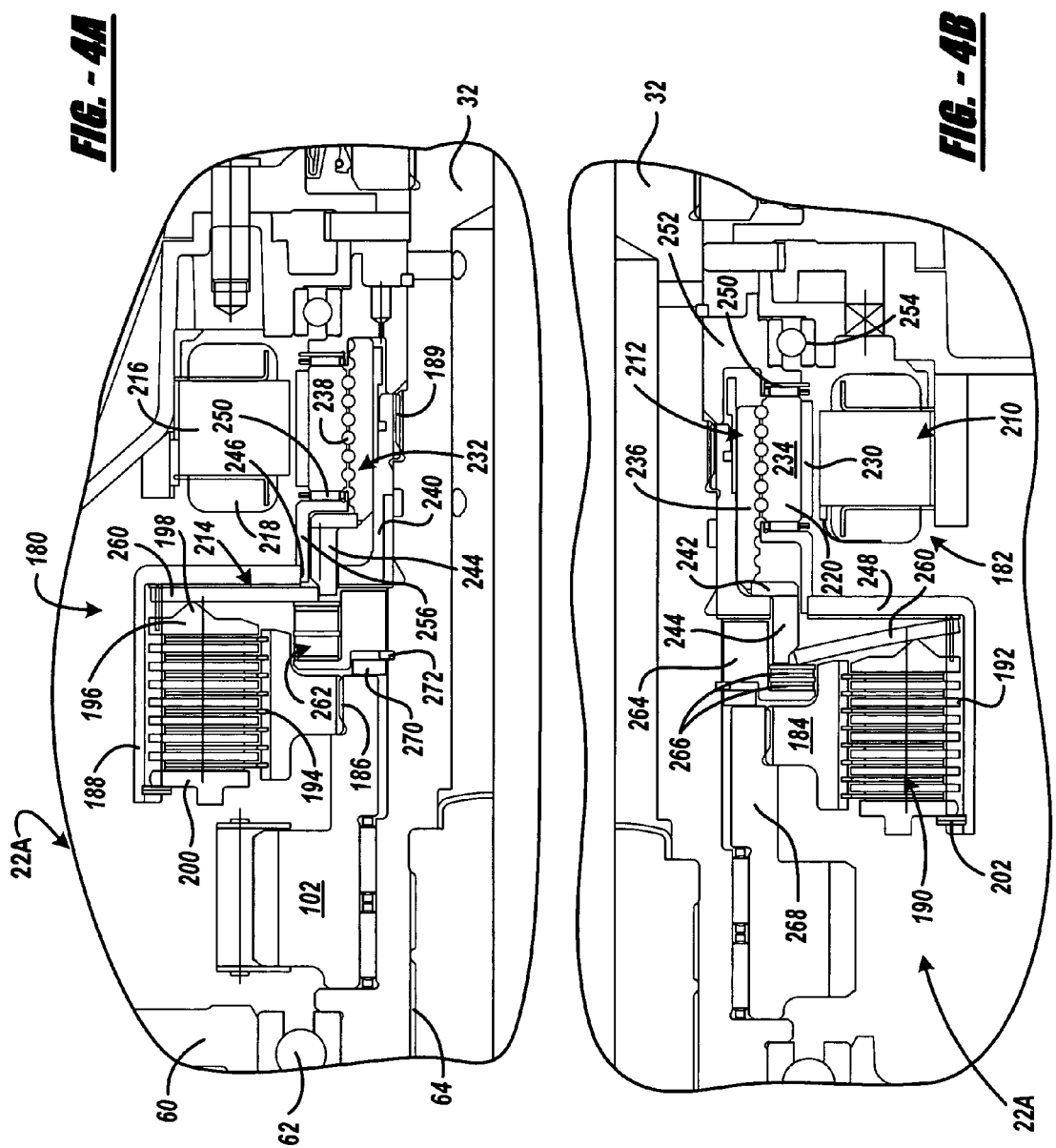
FIGS. 4A and 4B are partial sectional views of the transfer case equipped with a torque transfer mechanism according to a second embodiment of the present invention.

Referring now to FIGS. 4A and 4B, a modified version of transfer case 22 is identified by reference numeral 22A which includes a multi-plate friction clutch assembly 180 and a power-operated clutch actuator assembly 182 which together define a torque transfer mechanism according to another preferred embodiment of the present invention. Clutch assembly 180 includes a hub 184 fixed via a spline connection 186 to first sprocket 102, a drum 188 fixed via a spline connection 189 to rear output shaft 32, and a multi-plate clutch pack 190. Clutch pack 190 includes a set of outer clutch plates 192 splined for rotation with drum 188 which are alternatively interleaved with a set of inner clutch plates 194 that are splined for rotation with hub 184. Clutch assembly 180 further includes a pressure plate 196 that is splined for rotation with drum 188 and having an annular rim flange 198 formed thereon. A reaction plate 200 is splined to drum 188 and axially restrained thereon via a snap ring 202.

To provide means for moving pressure plate 196 between its released and locked positions, clutch actuator assembly 182 is generally shown to include an electric motor/brake unit 210, a torque/force conversion mechanism 212, and a force amplification mechanism 214. Motor/brake unit 210 includes an annular stator 216 that is secured to housing 60 and which has a coil 218, and a rotor 220 having a plurality of permanent magnets 230 secured thereto in close proximity to coil 218.

Torque/force conversion mechanism 212 is a ball screw operator 232 having an internally-threaded nut 234, an externally threaded screw 236, and balls 238 disposed in the aligned threads therebetween. Screw 236 is supported on an annular hub segment 240 of drum 188. A drive plate 242 is secured to one end of screw 236 and has a series of circumferentially aligned axially-extending pins 244. Pins 244 pass through a series of commonly aligned throughbores 246 formed in a plate segment 248 of drum 188. Nut 234 is shown to be formed integrally with rotor 220 and axially restrained between a pair of thrust washer assemblies 250. One of thrust washer assemblies 250 is disposed between a first end of nut 234 and a support plate 252 that is rotatably supported from housing via a bearing assembly 254. The other thrust washer assembly 250 is disposed between a second end of nut 234 and a cup-shaped retainer 256 that is secured to plate segment 248 of drum 188. Since drum 188 is driven by rear output shaft 32, the location of pins 244 within throughbores 246 causes screw 236 to likewise rotate in common with rear output shaft 32. As before, when no energy is applied/absorbed to drive/brake rotation of rotor 220, nut 234 rotates in unison with screw 236.

Ball screw operator 232 is operable to cause axial movement of screw 236 relative to nut 234 between its retracted and extended positions in response to relative rotation therebetween. The axially-directed thrust force generated by such axial movement of screw 234 is transferred from pins 244 to pressure plate 196 via force amplification mechanism 214. Force amplification mechanism 214 includes a series of disk levers 260 and having an outer end fixed via a spline connection to drum 188 and an inner end in engagement with the free end of pins 244. Levers 260 each have an intermediate portion engaging rim flange 198 on pressure plate 196. A return spring assembly 262 is disposed between hub 184 and disk levers 260 and includes a spring retainer 264 and a plurality of wave springs 266 disposed between a flange on spring retainer 264 and the inner end of disk levers 260 opposite pins 244. As seen, retainer 264 is located on rear output shaft 32 between an end of hub segment 268 of sprocket 102 by a thrust washer 270 and snap ring 272. Wave springs 266 are provided to bias disk levers 260 to a released position which, in turn, functions to bias screw 234 toward its retracted position.

The function and operation of motor/brake unit 210 is generally similar to that of motor/brake unit 110 in that energization of coil 218 in either of its motor and brake modes controls axial travel of screw 236 relative to nut 234. Screw 236 is moveable between its retracted and extended positions relative to nut 234 for causing pins 244 to pivot levers 260 so as to move pressure plate 196 between its corresponding released and locked positions. By way of example, screw 236 is shown in FIG. 4A in its retracted position and in FIG. 4B in its extended position. Spring assembly 262 is arranged to normally bias screw 236 toward its retracted position. Again, only minimal electric power is required from the vehicle's electrical system to precisely control engagement of clutch assembly 180 and thus, the drive torque transferred from rear output shaft 32 to front output shaft 42.

Figure 5:
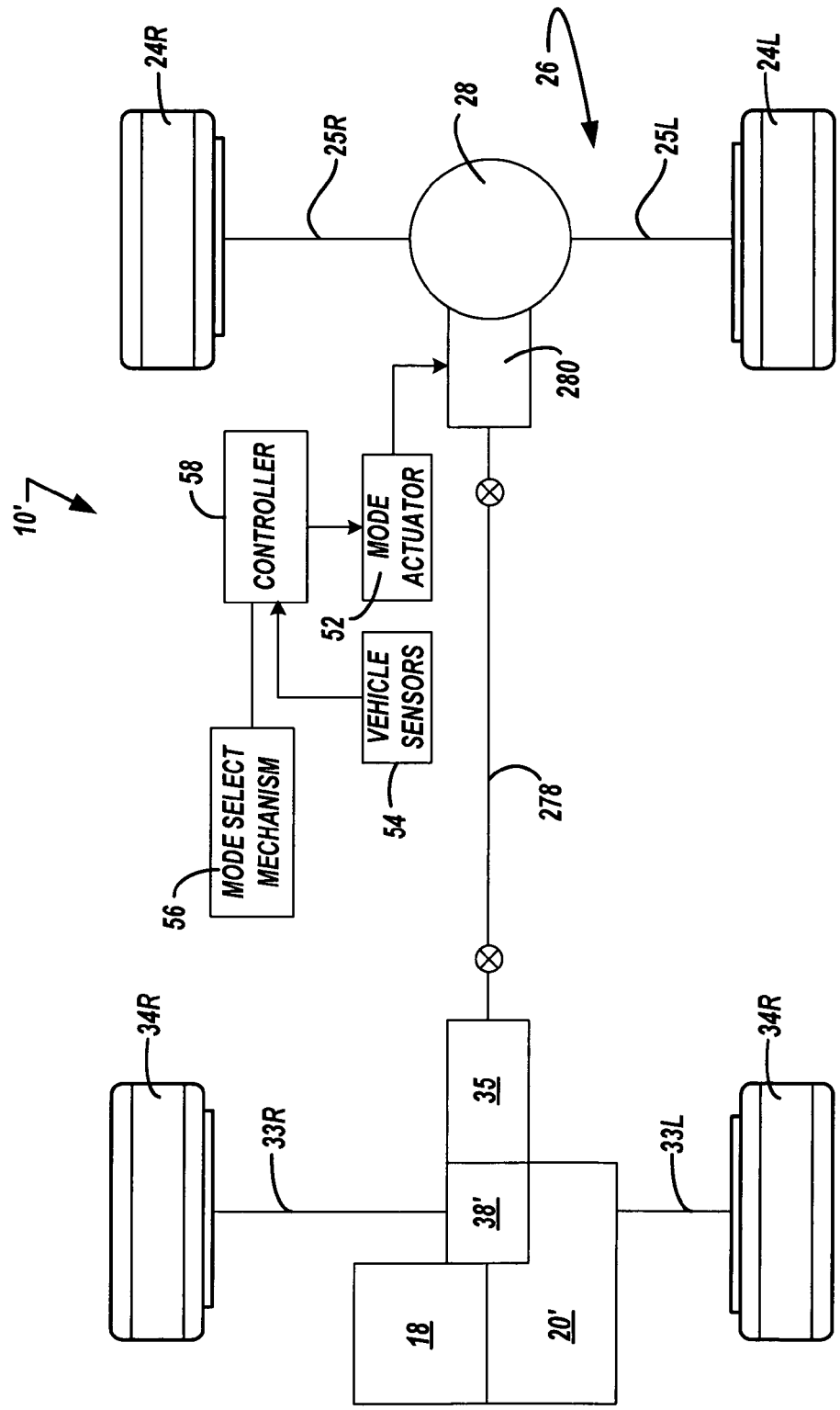
FIG. 5 is a schematic illustration of an alternative driveline for a four-wheel drive motor vehicle equipped with a power transmission device of the present invention.

To illustrate an alternative power transmission device to which the present invention is applicable, FIG. 5 schematically depicts a front-wheel based four-wheel drivetrain layout 10' for a motor vehicle. In particular, engine 18 drives a multi-speed transmission 20' having an integrated front differential unit 38' for driving front wheels 34L and 34R via axleshafts 33L and 33R. A transfer unit 35 is also driven by transmission 20' for delivering drive torque to the input member of a torque transfer mechanism, such as an in-line torque coupling 280, via a driveshaft 278. In particular, the input member of torque coupling 280 is coupled to driveshaft 278 while its output member is coupled to a drive component of rear differential 28 which, in turn, drives rear wheels 24L and 24R via axleshafts 25L and 25R. Accordingly, when sensors 54 indicate the occurrence of a front wheel slip condition, controller 58 adaptively controls actuation of torque coupling 280 such that drive torque is delivered "on-demand" to rear wheels 24. It is contemplated that torque transfer coupling 280 would include a multi-plate clutch assembly and a clutch actuator assembly that are similar in structure and function to either of the torque transfer mechanisms previously described herein.

Figure 6:
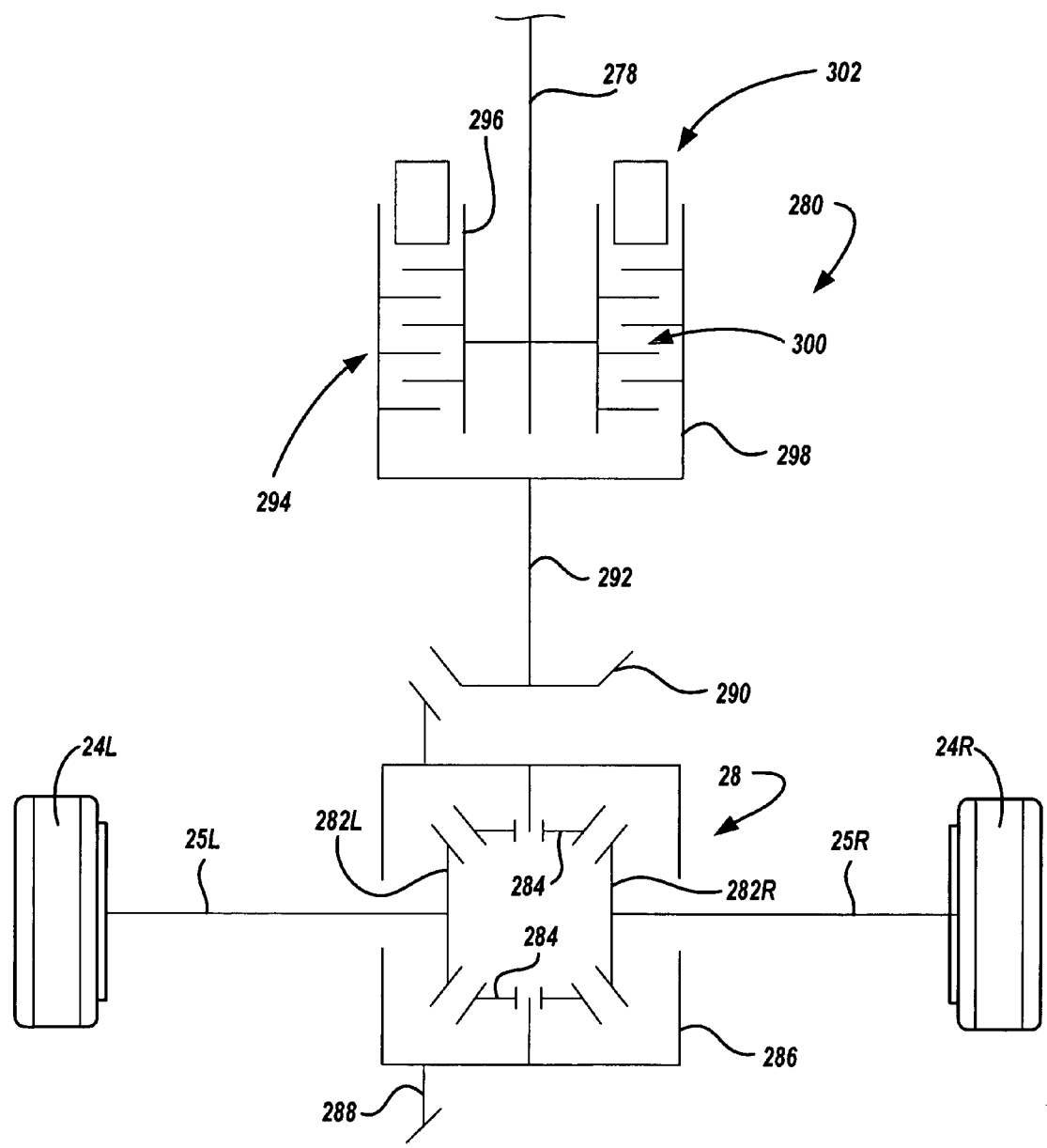
FIG. 6 is a schematic illustration of an in-line coupling associated with the drivetrain shown in FIG. 5 and equipped with a torque transfer mechanism according to the present invention.

Referring to FIG. 6, torque coupling 280 is schematically illustrated to be operably disposed between driveshaft 278 and rear differential 28. Rear differential 28 includes a pair of side gears 282L and 282R that are connected to corresponding rear axleshafts 25L and 25R. Differential 28 also includes a pair of pinions 284 that are rotatably supported on pinion shafts fixed to a carrier 286 and which are meshed with side gears 282L and 282R. A right-angled drive mechanism is associated with differential 28 and includes a ring gear 288 fixed for rotation with carrier 286 and which is meshed with a pinion gear 290 fixed for rotation with a pinion shaft 292.

Torque coupling 280 includes a multi-plate clutch assembly 294 operably disposed between driveshaft 278 and pinion shaft 292 and which includes a hub 296 fixed for rotation with driveshaft 278, a drum 298 fixed for rotation with pinion shaft 282, and a clutch pack 300. Torque coupling 280 also includes a clutch actuator assembly 302 for controlling the magnitude of the clutch engagement force applied to clutch assembly 294 and thus the amount of drive torque transferred from driveshaft 278 to rear differential 28. According to the present invention, clutch actuator assembly 302 is contemplated to be similar to either of clutch actuator assemblies 82 and 182 in that an electric motor/brake unit controls translation of an operator mechanism which, in turn, controls engagement of clutch pack 300.

Torque coupling 280 permits operation in any of the drive modes previously disclosed. For example, if the on-demand 4WD mode is selected, controller 58 regulates activation of clutch actuator 302 in response to the operating conditions detected by sensors 54 by controllably varying the electric control signal sent to the motor/brake unit. Selection of the part-time 4WD mode results in complete engagement of clutch pack 300 such that pinion shaft 292 is, in effect, rigidly coupled to driveshaft 278. Finally, in the two-wheel drive mode, clutch pack 300 is released such that pinion shaft 292 is free to rotate relative to driveshaft 278. Alternatively, elimination of mode select mechanism 56 would provide automatic on-demand operation of torque coupling 280 in a manner completely transparent to the vehicle operator.

Figure 7:
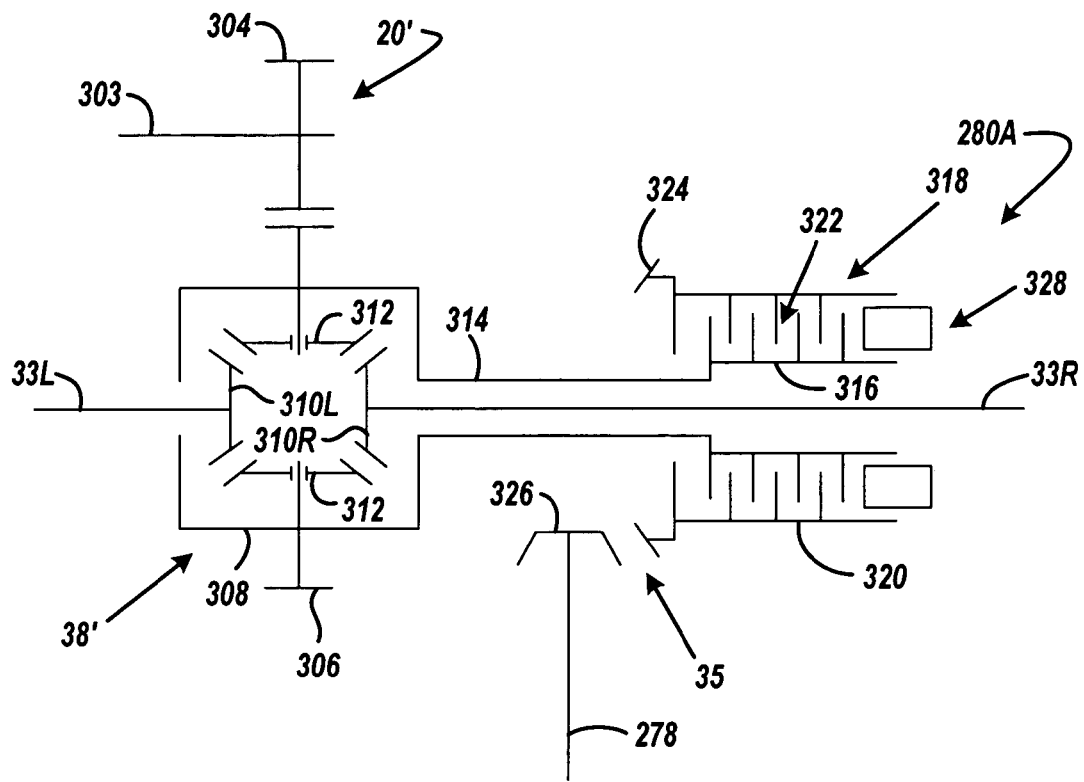
FIGS. 7 and 8 schematically illustrate power transmission devices for use in on-demand four-wheel drive vehicles equipped with a torque transfer mechanism according to the present invention.

Referring now to FIG. 7, torque coupling 280A is schematically illustrated in association with a power transmission device adapted for use with an on-demand four-wheel drive system based on a front-wheel drive vehicle similar to that shown in FIG. 5. Specifically, torque coupling 280A is now shown to be operably associated with transfer unit 35 for transferring drive torque from transaxle 20' to driveshaft 278. In this regard, an output shaft 303 of transaxle 20' is shown to drive an output gear 304 which, in turn, drives an input gear 306 that is fixed to a carrier 308 associated with front differential unit 38'. To provide drive torque to front wheels 34L and 34R, front differential unit 38' includes a pair of side gears 310L and 310R that are connected to corresponding axleshafts 33L and 33R. Differential unit 38' also includes a pair of pinions 312 that are rotatably supported on pinion shafts fixed to carrier 308 and which are meshed with side gears 310L and 310R. A transfer shaft 314 is provided to transfer drive torque from carrier 308 to a clutch hub 316 associated with a multi-pate clutch assembly 318. Clutch assembly 318 further includes a drum 320 and a clutch pack 322 having interleaved inner and outer clutch plates respectively connected between hub 316 and drum 320.

Transfer unit 35 is a right-angled drive mechanism including a ring gear 324 fixed for rotation with drum 320 of clutch assembly 318 and which is meshed with a pinion gear 326 fixed for rotation with driveshaft 278. As seen, a clutch actuator assembly 328 is schematically illustrated for controlling actuation of clutch assembly 318. According to the present invention, clutch actuator assembly 328 is similar to one of clutch actuator assemblies 82 and 182 previously described in that an electric motor/brake unit controls translational movement of an operator mechanism which, in turn, controls engagement of clutch pack 322. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 regulates actuation of clutch actuator 328 in response to the vehicle operating conditions detected by sensors 54 by varying the electric signal sent to the electric motor/brake unit. In this manner, the level of clutch engagement and the amount of drive torque that is transferred through clutch pack 322 to the rear driveline through transfer unit 35 and driveshaft 278 is adaptively controlled. Selection of a locked or part-time 4WD mode results in full engagement of clutch assembly 318 for rigidly coupling the front driveline to the rear driveline. In some applications, the mode selector 56 may be eliminated such that only the on-demand 4WD mode is available so as to continuously provide adaptive traction control without input from the vehicle operator.

Figure 8:
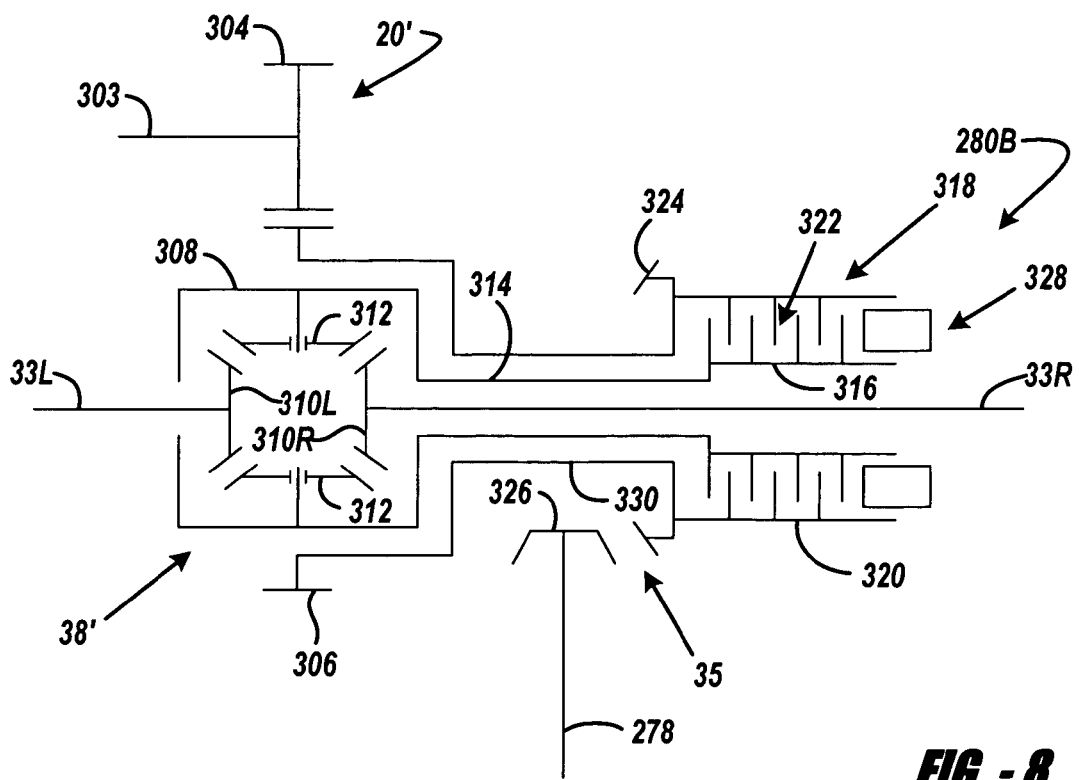

FIG. 8 illustrates a modified version of FIG. 7 wherein an on-demand four-wheel drive system is shown based on a rear-wheel drive motor vehicle that is arranged to normally deliver drive torque to rear wheels 24L and 24R while selectively transmitting drive torque to front wheels 34L and 34R through a torque coupling 280B. In this arrangement, drive torque is transmitted directly from transmission output shaft 303 to transfer unit 35 via an intermediate shaft 330 interconnecting input gear 306 to ring gear 324. Since ring gear 324 is driven by the output of transaxle 20', transfer unit 35 supplies drive torque to rear axle assembly 26 via driveshaft 278. To provide drive torque to front wheels 34L and 34R, torque coupling 280B is shown operably disposed between intermediate shaft 330 and transfer shaft 314. In particular, clutch assembly 318 is arranged such that drum 320 is driven with ring gear 324 by intermediate shaft 330. As such, actuation of clutch actuator 328 functions to transfer drive torque from drum 320 through clutch pack 322 to hub 316 which, in turn, drives carrier 308 of front differential unit 38' via transfer shaft 314. Again, the vehicle could be equipped with mode selector 56 to permit selection by the vehicle operator of either the adaptively controlled on-demand 4WD mode or the locked part-time 4WD mode.

In vehicles without mode selector 56, the on-demand 4WD mode is the only drive mode available and provides continuous adaptive traction control without input from the vehicle operator.

Figure 9:
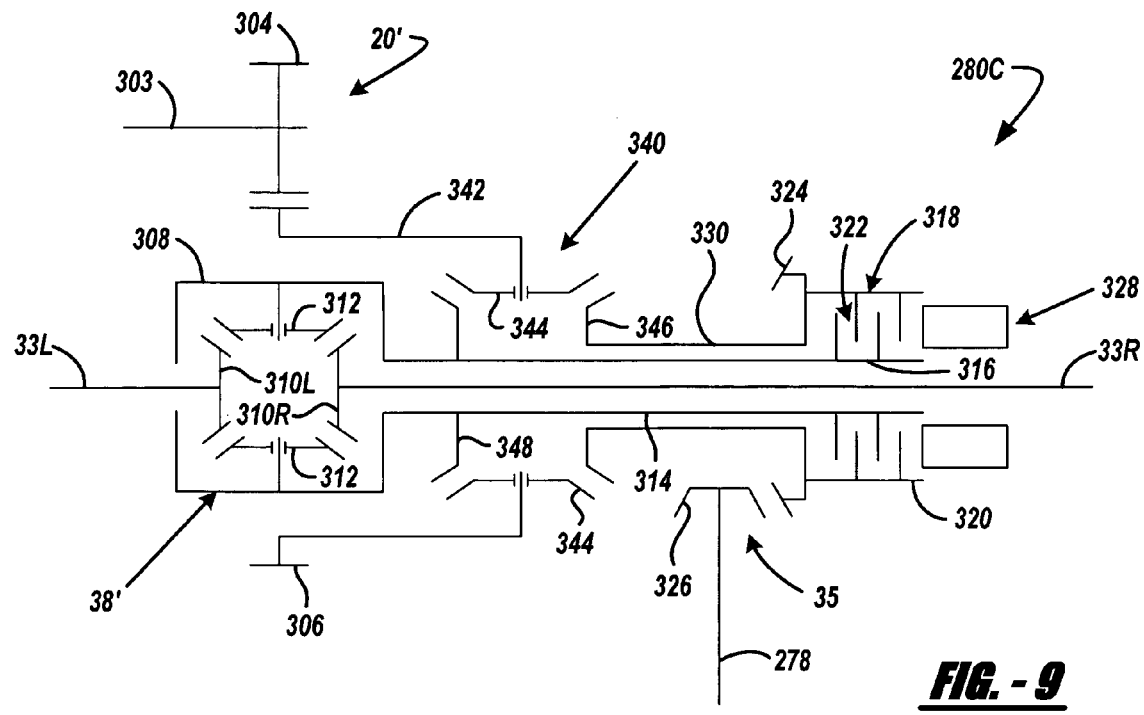
FIG. 9 shows a power transmission device for use in a full-time four-wheel drive vehicle which is equipped with a torque transfer mechanism according to the present invention.

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 340 is now operably installed between front differential unit 38' and transfer unit 35. In particular, output gear 306 is fixed for rotation with a carrier 342 of interaxle differential 340 from which pinion gears 344 are rotatably supported. A first side gear 346 is meshed with pinion gears 344 and is fixed for rotation with intermediate shaft 330 so as to be drivingly interconnected to the rear driveline through transfer unit 35. Likewise, a second side gear 348 is meshed with pinion gears 344 and is fixed for rotation with transfer shaft 314 and carrier 308 of front differential unit 38' so as to be drivingly interconnected to the front driveline.

A torque transfer mechanism, referred to as torque bias coupling 280C, is shown in FIG. 9 to be operably disposed between side gears 346 and 348. Torque bias coupling 280C is generally similar to torque transfer coupling 280B except that it is now operably arranged between the driven outputs of interaxle differential 340 for providing a torque biasing and slip limiting function. Torque bias coupling 280C is shown to include multi-plate clutch assembly 318 and clutch actuator 328. Clutch assembly 318 is operably arranged between transfer shaft 314 and intermediate shaft 330. In operation, when sensor 54 detects a vehicle operating condition, such as excessive interaxle slip, which requires adaptive traction control, controller 58 controls the electric motor/brake unit associated with clutch actuator 328 for controlling engagement of clutch assembly 318 and thus the torque biasing between the front and rear drivelines.

Figure 10:
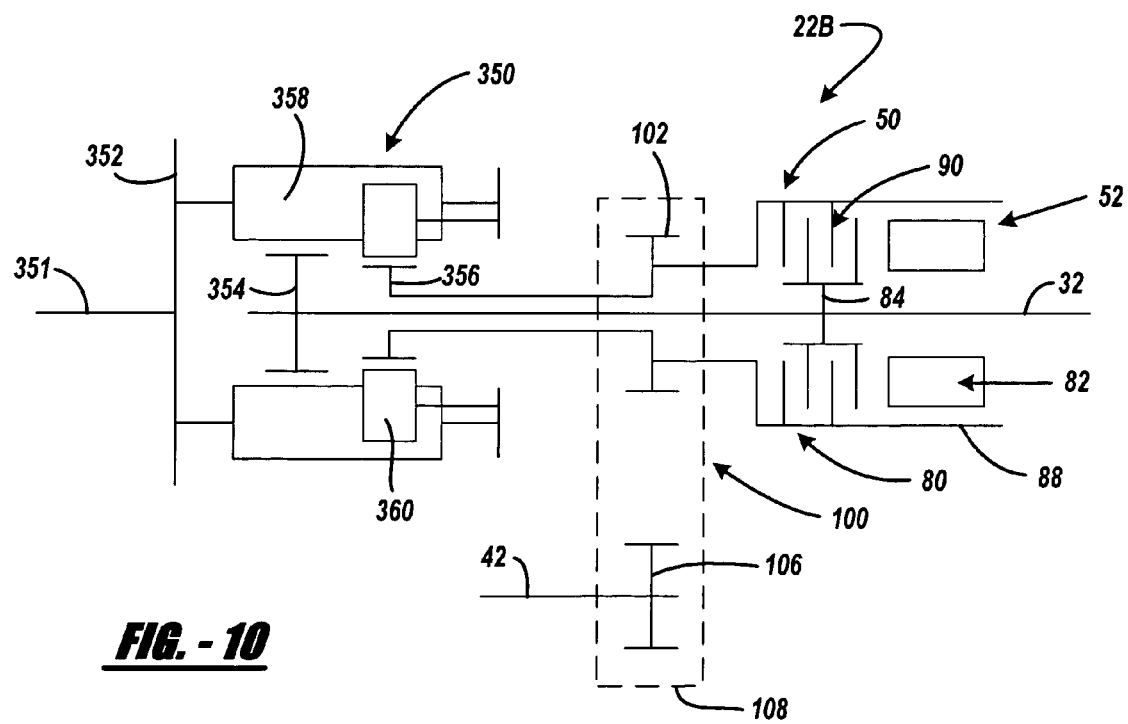
FIG. 10 illustrates a transfer case for use in a full-time four-wheel drive vehicle equipped with a torque transfer mechanism according to the present invention.

Referring now to FIG. 10, a full-time 4WD system is shown to include a transfer case 22B equipped with an interaxle differential 350 between an input shaft 351 and output shafts 32 and 42. Differential 350 includes a rotary input member defined as a planet carrier 352, a first rotary output member defined as a first sun gear 354, a second rotary output member defined as a second sun gear 356, and a gearset for accommodating speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32 so as to transmit drive torque to rear driveline 12. To transmit drive torque to front driveline 14, second sun gear 356 is coupled to transfer assembly 100 which includes a first sprocket 102 rotatably supported on rear output shaft 32, second sprocket 106 fixed to front output shaft 42, and power chain 108. Transfer case 22B further includes a torque biasing type of transfer clutch 50 having multi-plate clutch assembly 80 and a mode actuator 52 which includes clutch actuator assembly 82. Clutch assembly 82 includes drum 88 fixed for rotation with first sprocket 102, hub 84 fixed for rotation with rear output shaft 32, and multi-plate clutch pack 90 operably disposed therebetween. Clutch actuator assembly 82 is shown schematically but is contemplated to be structurally and functionally similar to clutch actuators 82 or 182 previously described. If a mode select mechanism is available, transfer case 22B would permit operation in either of an adaptive full-time four-wheel drive mode or a locked four-wheel drive mode.

Figure 11:
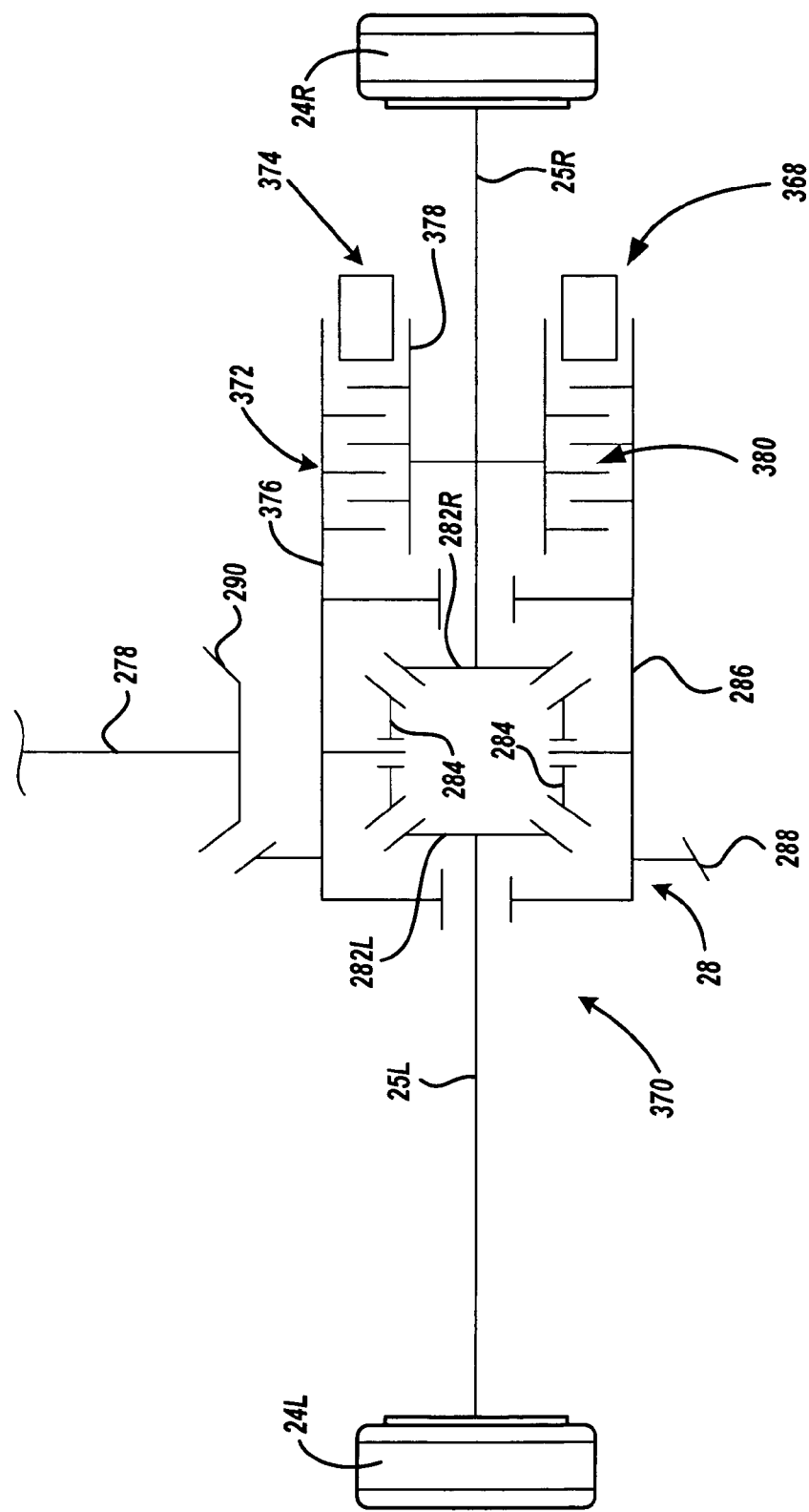
FIG. 11 shows a drive axle assembly equipped with a torque transfer mechanism of the present invention.

Referring now to FIG. 11, a drive axle assembly 370 is shown which is generally a modified version of rear axle assembly 26 and which incorporates a torque transfer mechanism in association with rear differential 28 so as to permit adaptive control of the torque biasing and intra-axle speed differentiation between rear wheels 24L and 24R. The torque transfer mechanism is a torque bias coupling 368 shown to include a multi-plate friction clutch assembly 372 that is operably disposed between carrier 286 and axleshaft 25R, and a clutch actuator assembly 374. Clutch assembly 372 includes a drum 376 fixed for rotation with carrier 286, a hub 378 fixed for rotation with axleshaft 25R, and a clutch pack 380 disposed therebetween. Clutch actuator assembly 374 is operable for controlling the magnitude of a clutch engagement force applied to clutch pack 380 and thus, the torque biasing between left wheel 24L and right wheel 24R. Again, clutch actuator assembly 374 is intended to be similar to one of clutch actuators 82 and 182 and includes a motor/brake unit, a torque/force conversion mechanism and a force amplification mechanism.

Figure 12:
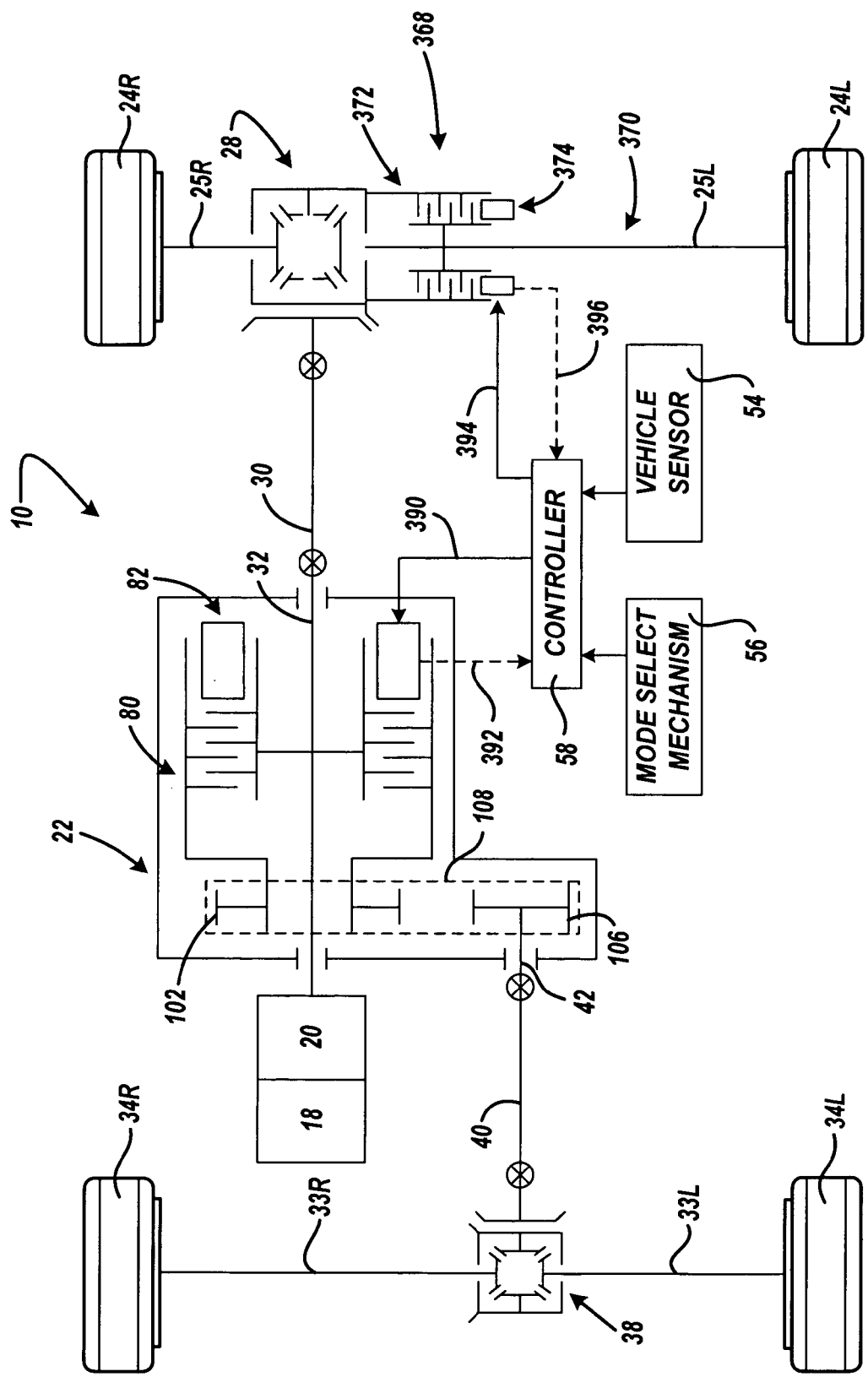
FIG. 12 is a schematic illustration of a drivetrain for a four-wheel drive vehicle incorporating two torque transfer mechanisms.
Figure 13:
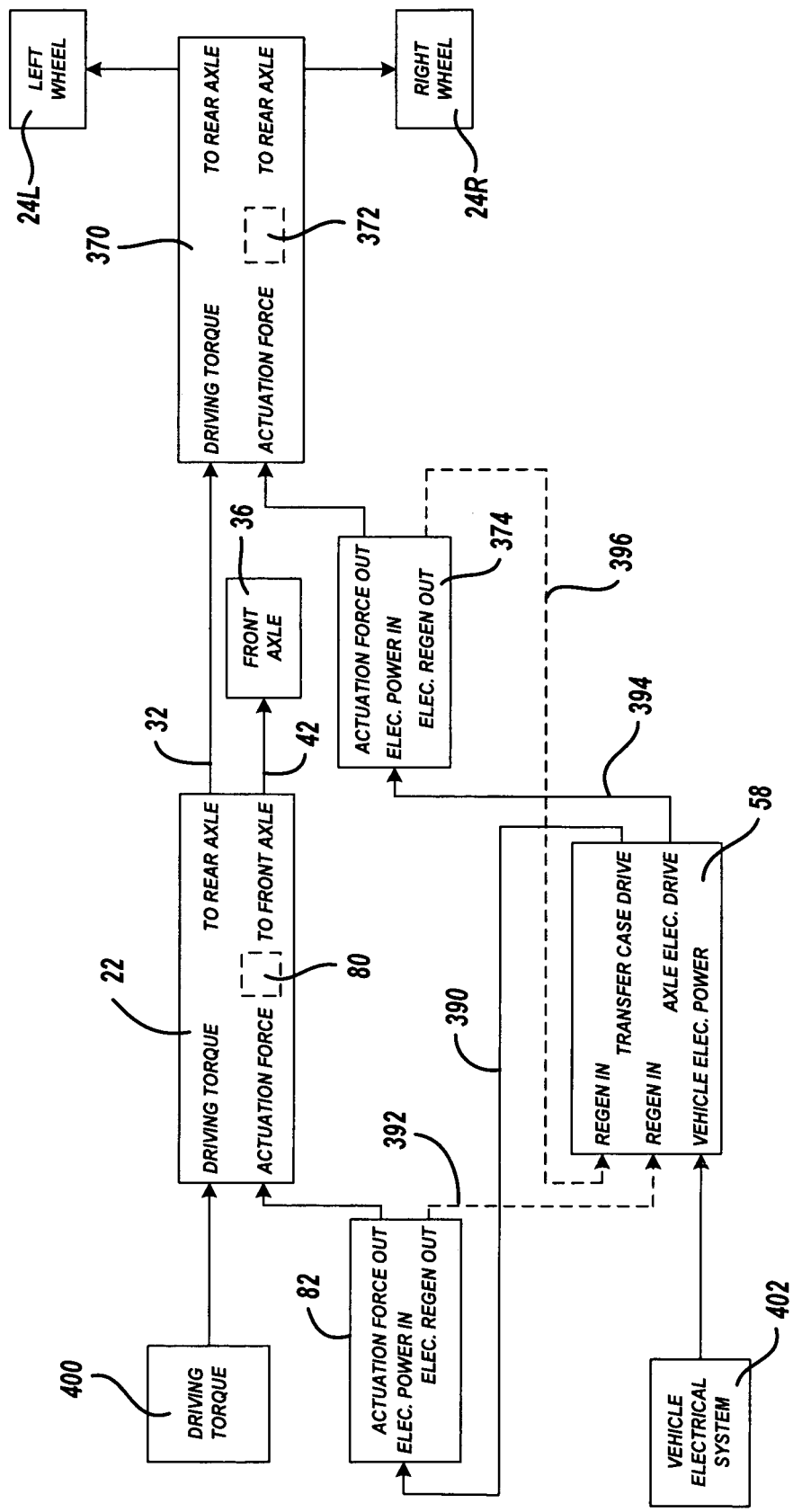
FIG. 13 is a block diagram of an electric power control system for the four-wheel drive vehicle shown in FIG. 12.

Drive axle assembly 370 can be used alone or in combination with other torque transfer mechanisms disclosed herein. In particular, drive axle assembly 370 can be associated with the primary axle in a rear wheel based on-demand 4WD drivetrain (FIGS. 1 and 8), a front wheel based on-demand 4WD drivetrain (FIGS. 5 and 7) or in either (or both) axles in full-time 4WD drivetrains (FIGS. 9 and 10). For example, FIG. 12 is a schematic illustration of drivetrain 10 from FIG. 1 with drive axle assembly 370 used in substitution for rear axle assembly 26. Electric power to clutch actuator assembly 82 of the torque transfer coupling in transfer case 22 is shown by power line 390 while regenerated electric power from clutch actuator assembly 82 is shown by dashed line 392. Similarly, electric power flow to clutch actuator assembly 374 of torque bias coupling 368 in drive axle assembly 370 is shown by power line 394 while regenerated electric power from clutch actuator assembly 374 is shown by dashed power line 396. Referring to FIG. 13, a block diagram is provided to better illustrate the electric power system associated with the drivetrain shown in FIG. 12. Block 400 indicates the drive torque supplied to transfer case 22 by engine 18 and transmission 20 while block 402 indicates the electric power delivered to controller 58 from the vehicle's host electrical system. As noted, a unique aspect of the present invention is that power from the vehicle's host system is only required during operation of the motor/brake unit in the motor mode to drive the rotor and possible in the brake mode to energize the coil windings. However, it should be understood that the electric power regenerated during operation of one clutch actuator in its brake mode can be used by controller 58 to provide electric power the other clutch actuator.

Figure 14:
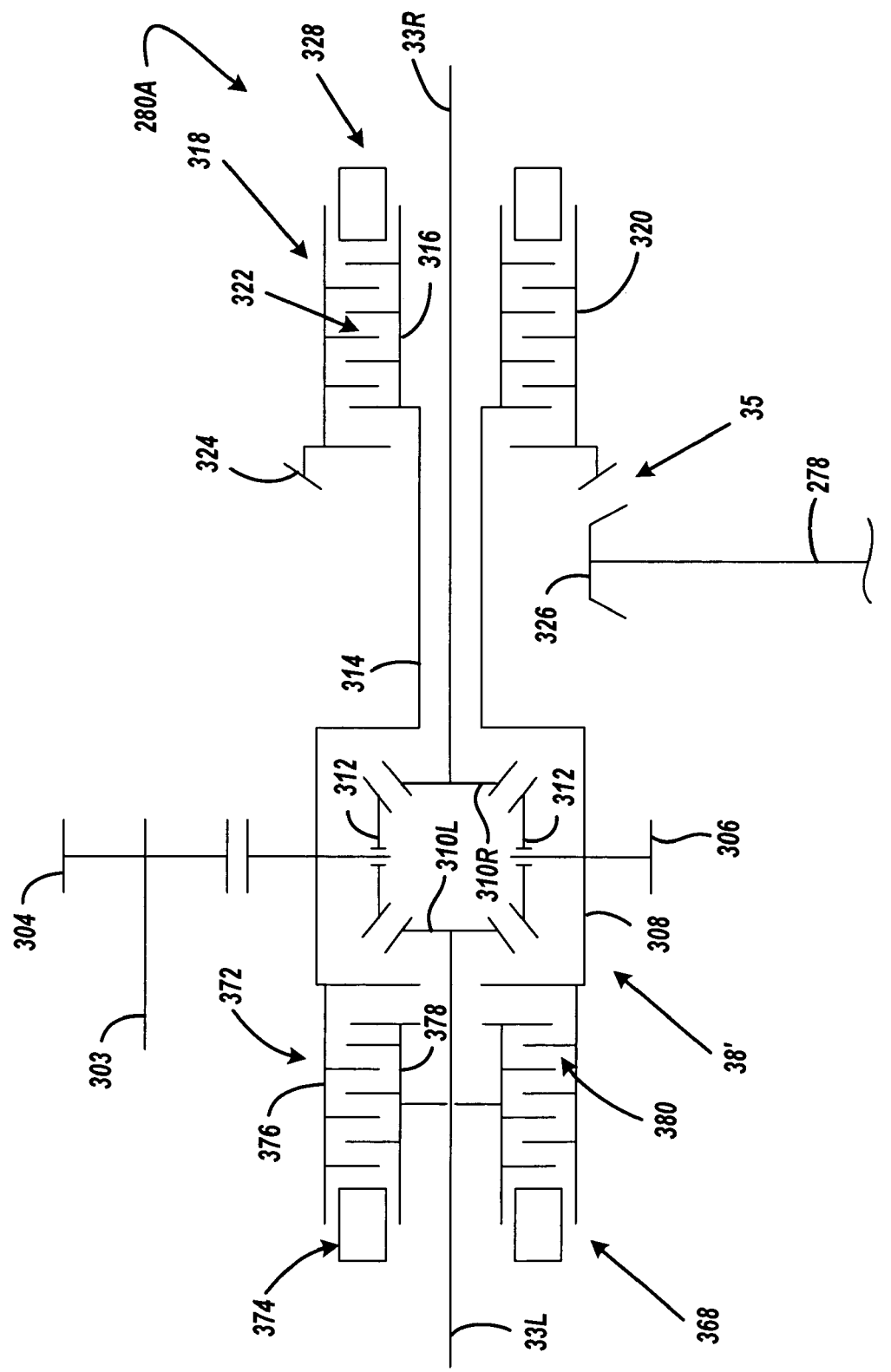
FIG. 14 is a schematic illustration of a drivetrain for a four-wheel drive vehicle according to the present invention.

The drivetrain shown in FIGS. 12 and 13 illustrate concurrent use and control of two distinct motor/brake units which are only minimally reliant on electric power from the vehicle's host electric system. A similar dual coupling arrangement using drive axle assembly 370 can be provided in association with the rear wheel based power transmission device shown in FIG. 8. In contrast, FIG. 14 is a modified version of the front wheel based power transmission device shown in FIG. 7 which now further incorporates torque bias coupling 368 in association with front differential 38'. In this arrangement, torque coupling 368 provides adaptive control of intra-axle differentiation between front wheels 34L and 34R while torque coupling 280A provides adaptive control of the drive torque transferred on-demand to the rear driveline. A power sharing arrangement similar to that shown in FIG. 13 would again be applicable for controlling the dual coupling powertrain of FIG. 14.

Figure 15:
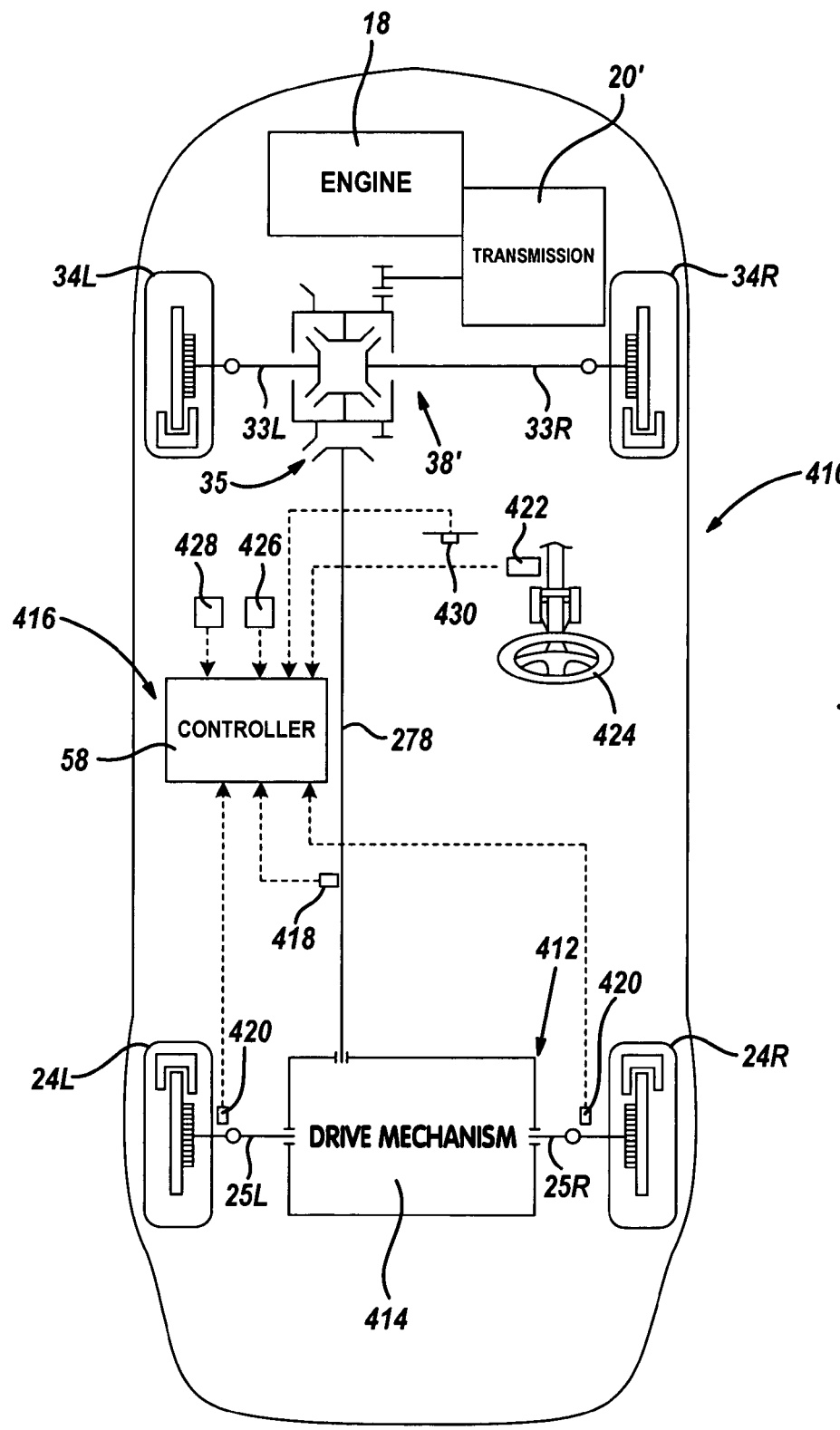
FIG. 15 is a diagrammatical illustration of an all-wheel drive motor vehicle equipped with a drive axle assembly having a torque distributing drive mechanism and an active yaw control system according to the present invention.

Referring now to FIG. 15, an all-wheel drive vehicle 410 includes engine 18 transversely mounted in a front portion of a vehicle body, transmission 20', front differential 38' which connects transmission 20' to front axleshafts 33L and 33R and left and right front wheels 34L and 34R, power transfer unit 35 which connects front differential 38' to propshaft 278, and a drive axle assembly 412 having a torque distributing drive mechanism 414 which connects propshaft 278 to axleshafts 25L and 25R for driving rear wheels 24L and 24R. As will be detailed, drive mechanism 414 is operable in association with a yaw control system 416 for controlling the transmission of drive torque through axleshaft 25L and 25R to rear wheels 24L and 24R.

In addition to controller 58, yaw control system 416 includes a plurality of sensors for detecting various operational and dynamic characteristics of vehicle 410. For example, a front wheel speed sensor 418 is provided for detecting a front wheel speed value based on rotation of propshaft 278, a pair of rear wheel speed sensors 420 are operable to detect the individual rear wheel speed values based rotation of left and right axleshafts 25L and 25R, and a steering angle sensor 422 is provided to detect the steering angle of a steering wheel 424. The sensors also include a yaw rate sensor 426 for detecting a yaw rate of the body portion of vehicle 410, a lateral acceleration sensor 428 for detecting a lateral acceleration of the vehicle body, and a lock switch 430 for permitting the vehicle operator to intentionally shift drive mechanism 414 into a locked mode. As will be detailed, controller 58 controls operation of a pair of torque transfer mechanism within drive mechanism 414 by utilizing a control strategy that is based on input signals from the various sensors and lock switch 430.

Drive axle assembly 412 includes an axle housing 432 within which drive mechanism 414 is rotatably supported. In general, torque distributing drive mechanism 414 includes an input pinion shaft 434 driven by propshaft 278, a differential 436, a speed changing unit 438, a first torque coupling 440 and a second torque coupling 442. As seen, input shaft 434 includes a pinion gear 444 that is in constant mesh with a hypoid ring gear 446. Ring gear 446 is fixed for rotation with a drive case 448 associated with differential 436. As seen, differential 436 is a planetary gearset having an annulus gear 450 fixed for rotation with drive case 448, a sun gear 452 fixed for rotation with right axleshaft 25R, a differential carrier 454 fixed for rotation with left axleshaft 25L, and meshed pairs of first planet gears 456 and second planet gears 458. First planet gears 456 are shown to be meshed with sun gear 452 while second planet gears 458 are meshed with annulus gear 450. Differential carrier 454 is a multi-piece assembly having a front carrier ring 460 interconnected to a rear carrier ring 462 with first and second pins extending therebetween on which corresponding first and second planet gears 456 and 458 are rotatably supported. Differential 436 is operable to transfer drive torque from drive case 448 to axleshafts 25L and 25R at a ratio defined by the gear components while permitting speed differentiation therebetween. Preferably, a 50/50 torque split ratio is established by differential 436 for use in this particular drive axle application. It should be understood that differential 436 is merely intended to represent one differential arrangement applicable for use with the present invention and that the other known planetary and hypoid-type differentials could be substituted for use with the present invention.

Speed changing unit 438 includes a gearset having an input sun gear 470, an output sun gear 472, and a plurality of equally-spaced compound gears 474. Speed changing unit 438 also includes a first shaft 476 which connects input sun gear 470 for common rotation with drive case 448 and a second shaft 478 which is driven by output sun gear 472. Compound gears 474 each include a first speed gear 482 that is interconnected to a second speed gear 484 via an integral hub segment 486. Furthermore, first speed gear 482 of each compound gear 474 is meshed with input sun gear 470 while its corresponding second speed gear 484 is meshed with output sun gear 472. Compound gears 474 are rotatably supported on pins 488 that are fixed to a support plate segment 490 of housing 52.

In operation, speed changing unit 438 functions to cause a change in the rotary speed of second shaft 478 relative to the rotary speed of first shaft 476. In particular, the speed ratio established between first shaft 476 and second shaft 478 is based on the size and number of teeth for each gear component of speed changing unit 438. In accordance with one first preferred arrangement, speed changing unit 438 is an "overdrive" unit that is operable to increase the speed of second shaft 478 relative to first shaft 476. To accomplish such a speed increase, it is contemplated that input sun gear 470 could have 27 teeth and output sun gear 484 could have 24 teeth while both first speed gear 474 and second speed gear 104 of compound gears 94 could each have 17 teeth pursuant to one non-limiting example for speed changing unit 438.

Figure 16:
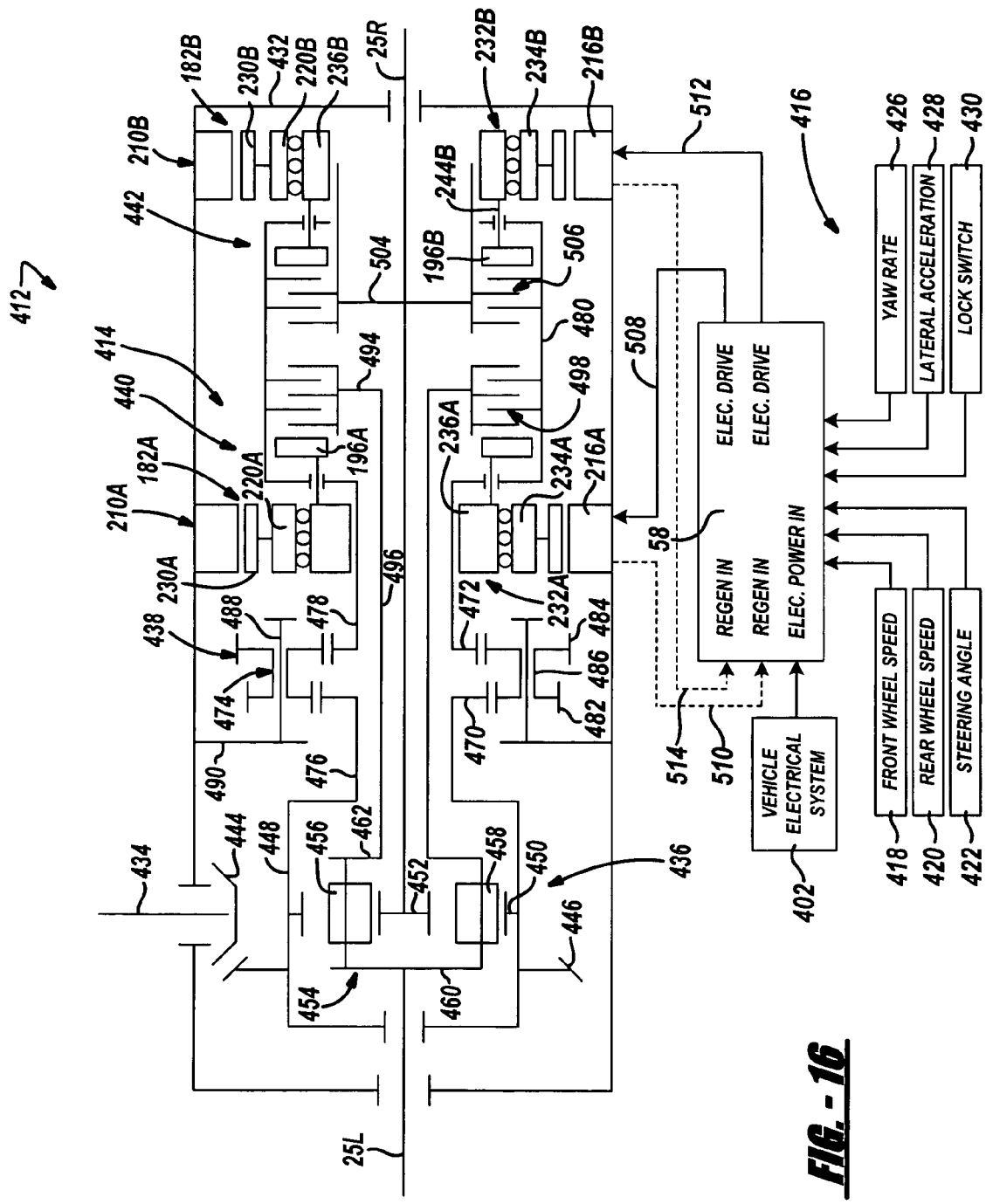
FIG. 16 is a schematic illustration of the torque distributing drive mechanism disclosed in FIG. 15.

With continued reference to FIG. 16, first torque coupling 440 is shown to be operably disposed between differential carrier 454 and a clutch drum 480. In particular, a clutch hub 494 of first torque coupling 440 is connected to rear carrier ring 462 of differential carrier 454 via a third shaft 496. As seen, third shaft 496 surrounds right axleshaft 25R while both first shaft 476 and second shaft 478 surround third shaft 496. In addition, clutch drum 480 is fixed for rotation with second shaft 478. First coupling 440 also includes a multiplate clutch pack 498 that is operably disposed between drum 480 and hub 494, and a power-operated clutch actuator assembly 182A. Clutch actuator assembly 182A is generally similar to clutch actuator assembly 182 of FIGS. 4A and 4B in that it includes an electric motor/brake unit 210A and a ball screw operator 232A for controlling bidirectional axial movement of a pressure plate 196A relative to clutch pack 498. Motor/brake unit 210A is schematically shown to include a stator 216A that is fixed to housing 432 and a rotor 220A having a plurality of magnets 230A secured thereto in close proximity to the coil of stator 216A. Ball screw operator 232A has a nut 234A fixed to rotor 216A, an axially moveable screw 236A supported on second shaft 478, and pins 244A fixed to screw 236A and which extend through bores in drum 480. As such, ball screw operator 232A normally rotates with drum 480 at the rotary speed of second shaft 478. The structure and function of clutch actuator assembly 182A is intended to be substantially similar to that of clutch actuator assembly 182 such that selective operation of motor/brake unit 210A in either of its motor and brake modes results in controlled relative rotation between nut 234A and screw 236A for controlling axial movement of screw 236A. First coupling 440 is operable in a first or "released" mode so as to permit unrestricted rotation of second shaft 478 relative to third shaft 496. In contrast, first coupling 440 is also operable in a second or "locked" mode to couple third shaft 496 for common rotation with second shaft 478.

As will be recalled, speed changing unit 438 is driven by drive case 448 of differential 436 and functions to increase the rotary speed of second shaft 478. Thus, first coupling 440 functions in its locked mode to increase the rotary speed of differential carrier 454 which, in turn, causes a corresponding increase in the rotary speed of left axleshaft 25L. Such an increase in the rotary speed of left axleshaft 25L causes differential 436 to drive right axleshaft 25R at a corresponding reduced speed, thereby directing more drive torque to left axleshaft 25L than is transmitted to right axleshaft 25R. First coupling 440 is shifted between its released and locked modes via actuation of power-operated clutch actuator 128A in response to control signals from controller 58.

Second coupling 442 is shown to be operably disposed between right axleshaft 25R and clutch drum 480. In particular, second coupling 442 includes a clutch hub 504 that is fixed for rotation with right axleshaft 25R, a multi-plate clutch pack 506 disposed between hub 504 and drum 480, and a power-operated clutch actuator assembly 182B. As seen, clutch actuator assembly 182B is similar to that of clutch actuator assembly 182A such that common/similar components are identified with corresponding "A" and "B" suffixes. Specifically, clutch actuator assembly 182B includes an electric motor/brake unit 210B and a ball screw operator 232B for controlling axial movement of a pressure plate 196B relative to clutch pack 506. Accordingly, selective actuation of motor/brake unit 210B in either of its motor and brake modes controls relative rotation between nut 234B and screw 236B of operator 232B for controlling axial movement of screw 236B. Screw 236B is shown to be supported on hub 504 but could likewise be supported on right axleshaft 25R. Second coupling 442 is operable in a first or "released" mode so as to permit unrestricted relative rotation between axleshaft 25R and second shaft 478. In contrast, second coupling 442 is also operable in a second or "locked" mode to couple axleshaft 25R for common rotation with second shaft 478. Thus, second coupling 442 functions in its locked mode to increase the rotary speed of right axleshaft 25R which, in turn, causes differential 436 to decrease the rotary speed of left axleshaft 25L, thereby directing more drive torque to right axleshaft 30R than is directed to left axleshaft 25L. Second coupling 442 is shifted between its released and locked modes via actuation of power-operated clutch actuator 182B in response to control signals from controller 58.

In accordance with the arrangement shown, torque distributing drive mechanism 414 is operable in coordination with yaw control system 416 to establish at least four distinct operational modes for controlling the transfer of drive torque from input shaft 434 to axleshafts 25L and 25R. In particular, a first operational mode is established when first coupling 440 and second coupling 442 are both in their released mode such that differential 436 acts as an "open" differential so as to permit unrestricted speed differentiation with drive torque transmitted from drive case 448 to each axleshaft 25L and 25R based on the tractive conditions at corresponding rear wheels 24L and 24R. A second operational mode is established when both first coupling 440 and second coupling 442 are in their locked mode such that differential 436 acts as a "locked" differential with no speed differentiation permitted between rear axleshafts 25L and 25R. This mode can be intentionally selected via actuation of lock switch 430 when vehicle 410 is being operated off-road or on poor roads.

A third operational mode is established when first coupling 440 is shifted into its locked mode while second coupling 442 is operable in its released mode. As a result, left axleshaft 25L is overdriven at the same increased speed as second speed gear 484. As noted, such an increase in the rotary speed of left axleshaft 25L causes a corresponding speed reduction in right axleshaft 25R. Thus, this third operational mode causes right axleshaft 25R to be underdriven while left axleshaft 25L is overdriven when required to accommodate the current tractive or steering condition detected and/or anticipated by controller 58 based on the particular control strategy used. Likewise, a fourth operational mode is established when first coupling 440 is shifted into its released mode and second coupling 442 is shifted into its locked mode. As a result, right rear axleshaft 25R is overdriven relative to drive case 448 which, in turn, causes left axleshaft 25L to be underdriven at a corresponding reduced speed. Thus, this fourth operational mode causes right axleshaft 25R to be overdriven while left axleshaft 25L is underdriven when required to accommodate the current tractive or steering conditions detected and/or anticipated by controller 58.

At the start of vehicle 410, power from engine 18 is transmitted to front wheels 34L and 34R through transmission 20' and front differential 38'. Drive torque is also transmitted to torque distributing drive mechanism 414 through PTU 35 and propshaft 270 which, in turn, rotatably drives input pinion shaft 434. Typically, couplings 440 and 442 would be released such that drive torque is transmitted through differential 436 to rear wheels 25L and 25R. However, upon detection or anticipation of lost traction at front wheels 34L and 34R, one or both torque couplings 440 and 442 can be engaged to provide more drive torque to rear wheels 25L and 25R based on the tractive needs of the vehicles.

In addition to on-off control of the couplings to establish the various drive modes associated with overdrive connections through speed changing unit 438, it is further contemplated that variable clutch engagement forces can be generated by power-operated actuators 182A and 182B to adaptively regulate the left-to-right speed and torque characteristics. This "adaptive" control feature functions to provide enhanced yaw and stability control for vehicle 410. For example, a reference yaw rate can be determined based on several factors including the steering angle detected by steering angle sensor 422, the vehicle speed as calculated based on signals from the various speed sensors, and a lateral acceleration as detected by lateral acceleration sensor 428. Controller 58 compares this reference yaw rate with an actual yaw rate value detected by yaw sensor 426. This comparison will determine whether vehicle 410 is in an understeer or an oversteer condition so as to permit yaw control system 416 to be adaptively control actuation of the couplings to accommodate these types of steering tendencies. Controller 58 can address such conditions by shifting drive mechanism 414 into the specific operative drive mode that is best suited to correct the actual or anticipated oversteer or understeer situation. Optionally, variable control of the couplings also permits adaptive regulation of the side-to-side torque transfer and speed differentiation characteristics if one of the distinct drive modes is not adequate to accommodate the current steer tractive condition. In accordance with the power sharing feature of this invention, electric power to motor/brake unit 210A of first torque coupling 440 is shown by power line 508 while regenerated power is shown by dashed line 510. Similarly, electric power flow to electric motor/brake unit 210B of second torque coupling 442 is shown by power line 512 while regenerated power is shown by dashed lien 514.

Figure 17:
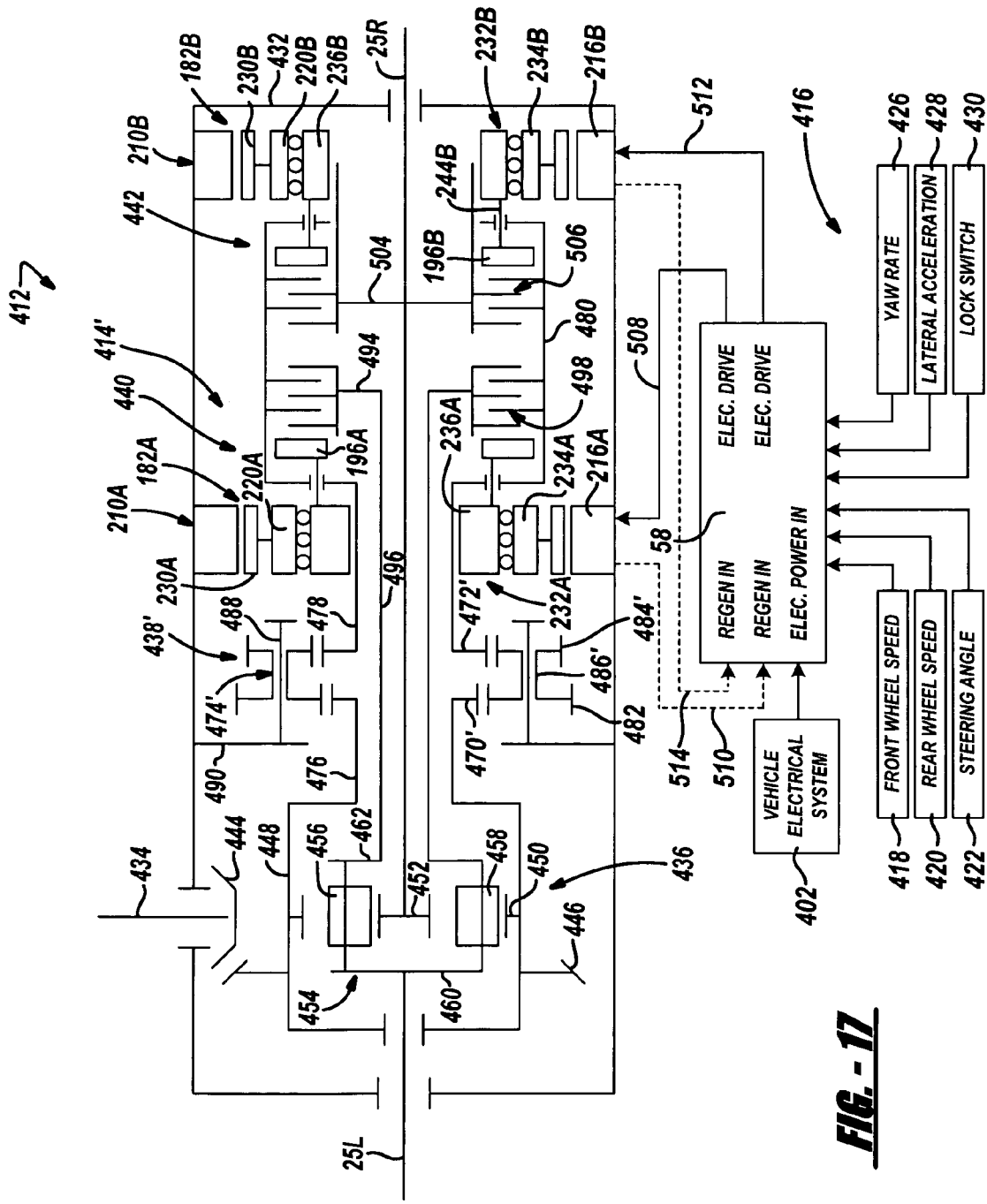
FIG. 17 is a schematic illustration of an alternative embodiment of the torque distributing drive mechanism of the present invention.

Referring now to FIG. 17, an alternative embodiment of torque distributing drive mechanism 414 of FIG. 16 is shown installed in drive axle assembly 412 and is designated by reference numeral 414'. Generally speaking, a large number of components are common to both drive mechanism 414 and 414', with such components being identified by the same reference numbers. However, drive mechanism 414' is shown to include a modified speed changing unit 438'. In particular, speed changing unit 438' is a speed reducing or "underdrive" gearset which includes an input sun gear 470', an output sun gear 472', and compound gears 474'. Each compound gear 474' includes a first speed gear 482' meshed with input sun gear 470' and a second speed gear 484' meshed with output sun gear 472'. An integral hub segment 486' interconnects first speed gear 482' for common rotation with second speed gear 484'. In essence, speed changing unit 438' is now arranged to reduce the speed of second shaft 478 relative to first shaft 476 at a reduction ratio determined by the gear components. To accomplish this speed reduction feature, it is contemplated that input sun gear 470' could have 24 teeth and output sun gear 472' could have 27 teeth while first speed gear 482' and second speed gear 484' each still could have 17 teeth pursuant to one non-limiting example.

Drive mechanism 414' is similar but slightly different in operation compared to drive mechanism 414 in that first coupling 440 now functions to cause left axleshaft 25L to be underdriven relative to right axleshaft 25R while second coupling 442 functions to cause right axleshaft 25R to be underdriven relative to left axleshaft 25L. As such, the four distinct operational modes previously described are again available and can be established by drive mechanism 414' via selective actuation of power-operated clutch actuators 182A and 182B.

Figure 18:
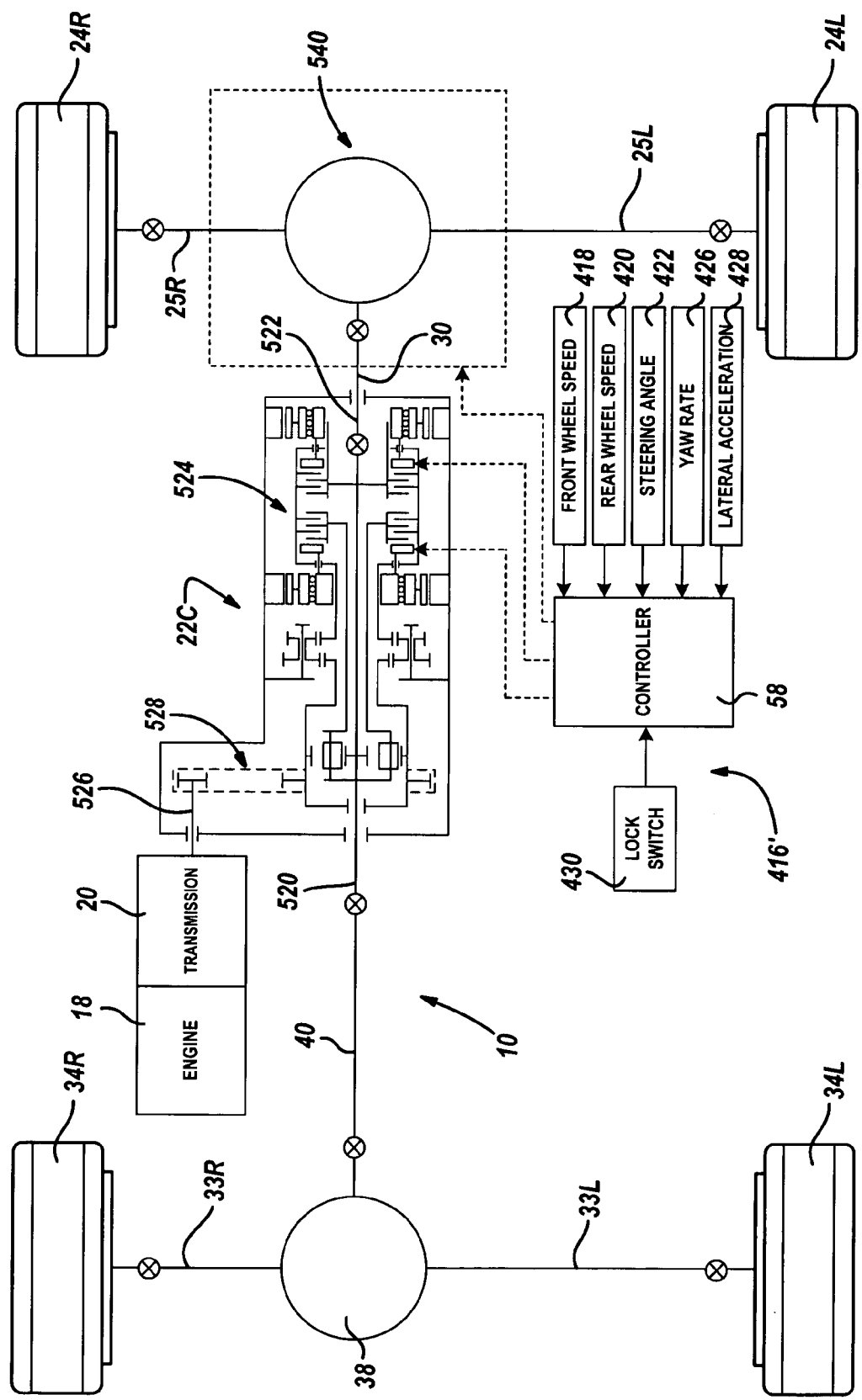
FIG. 18 is an illustration of the torque distributing drive mechanism of FIG. 17 now installed in a transfer case for use in four-wheel drive vehicles.

Referring now to FIG. 18, four-wheel drive vehicle 10 is now shown equipped with a transfer case 22C that is operable for transferring drive torque from the output of transmission 20 to a front output shaft 520 and a rear output shaft 522. Front output shaft 520 drives front propshaft 40 which, in turn, drives front differential 38 for driving front wheels 34L and 34R. Likewise, rear output shaft 522 drives rear propshaft 30 which, in turn, drives rear differential 28 for driving rear wheels 24L and 24R. Transfer case 22C includes a torque distributing drive mechanism 524 which functions to transmit drive torque from its input shaft 526 to both of output shafts 520 and 522 so as to bias the torque distribution ratio therebetween, thereby controlling the tractive operation of vehicle 10. As seen, torque distribution mechanism 524 is operably associated with a traction control system 416' for providing this adaptive traction control feature for vehicle 10.

Figure 19:
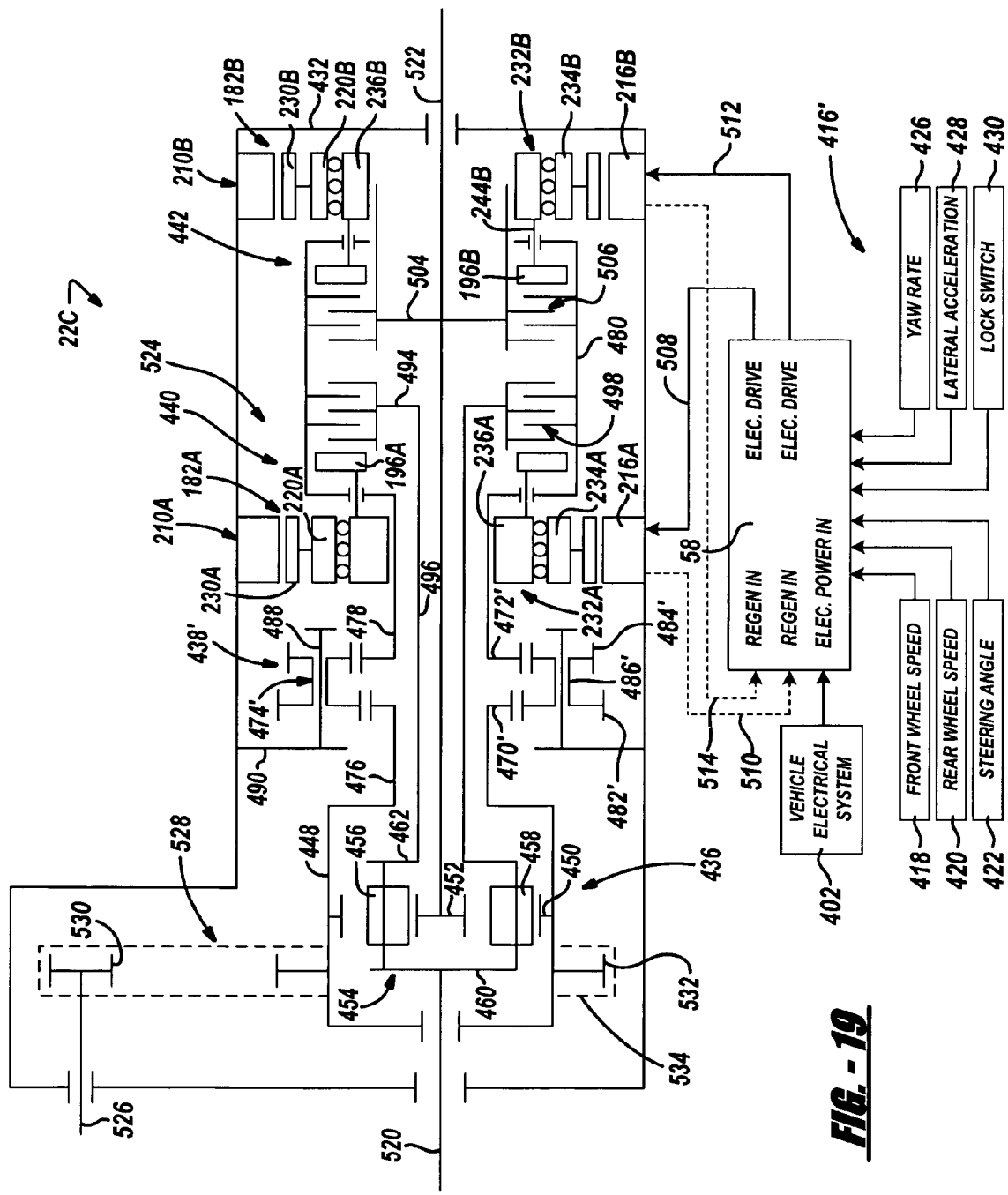
FIG. 19 is a schematic drawing of the transfer case shown in FIG. 18.

Referring primarily to FIG. 19, torque distribution mechanism 524 of transfer case 22C is shown to be generally similar in structure to drive mechanism 414' of FIG. 17 with the exception that drive case 448 is now drivingly connected to input shaft 526 via a transfer assembly 528. In the arrangement shown, transfer assembly 528 includes a first sprocket 530 driven by input shaft 526, a second sprocket 532 driving drive case 448, and a power chain 534 therebetween. As seen, front output shaft 520 is driven by differential carrier 454 of differential 436 which now acts as a center or "interaxle" differential for permitting speed differentiation between the front and rear output shafts while establishing a full-time four-wheel drive mode. In addition, sun gear 452 of differential 436 drives rear output shaft 522. Also, hub 504 of second coupling 442 is shown to be coupled for common rotation with rear output shaft 522.

Control over actuation of torque couplings 440 and 442 results in corresponding increases or decreases in the rotary speed of rear output shaft 522 relative to front output shaft 520, thereby controlling the amount of drive torque transmitted therebetween. In particular, when both torque couplings are released, unrestricted speed differentiation is permitted between the front and rear output shafts while the gear ratio established by the components of interaxle differential 436 controls the front-to-rear torque ratio based on the current tractive conditions of the front and rear wheels. In contrast, with both torque couplings engaged, a locked four-wheel drive mode is established wherein no interaxle speed differentiation is permitted between the front and rear output shafts. Such a drive mode can be intentionally selected via lock switch 430 when vehicle 10 is driven off-road or during severe road conditions. An adaptive full-time four-wheel drive mode is made available under control of traction control system 416' to limit interaxle slip and vary the front-rear drive torque distribution ratio based on the tractive needs of the front and rear wheels as detected by the various sensors. In addition to transfer case 22C, vehicle 10 could also be equipped with a rear axle assembly 540 having the limited slip arrangement of FIG. 11 or one of torque distributing drive mechanisms 414 or 414' of FIGS. 16 and 17, as is identified by the phantom lines in FIG. 18. Under any such scenario, electrical power can be regenerated and used to actuate the other power-operated actuators or other electrically-powered vehicle systems.

Figure 20:
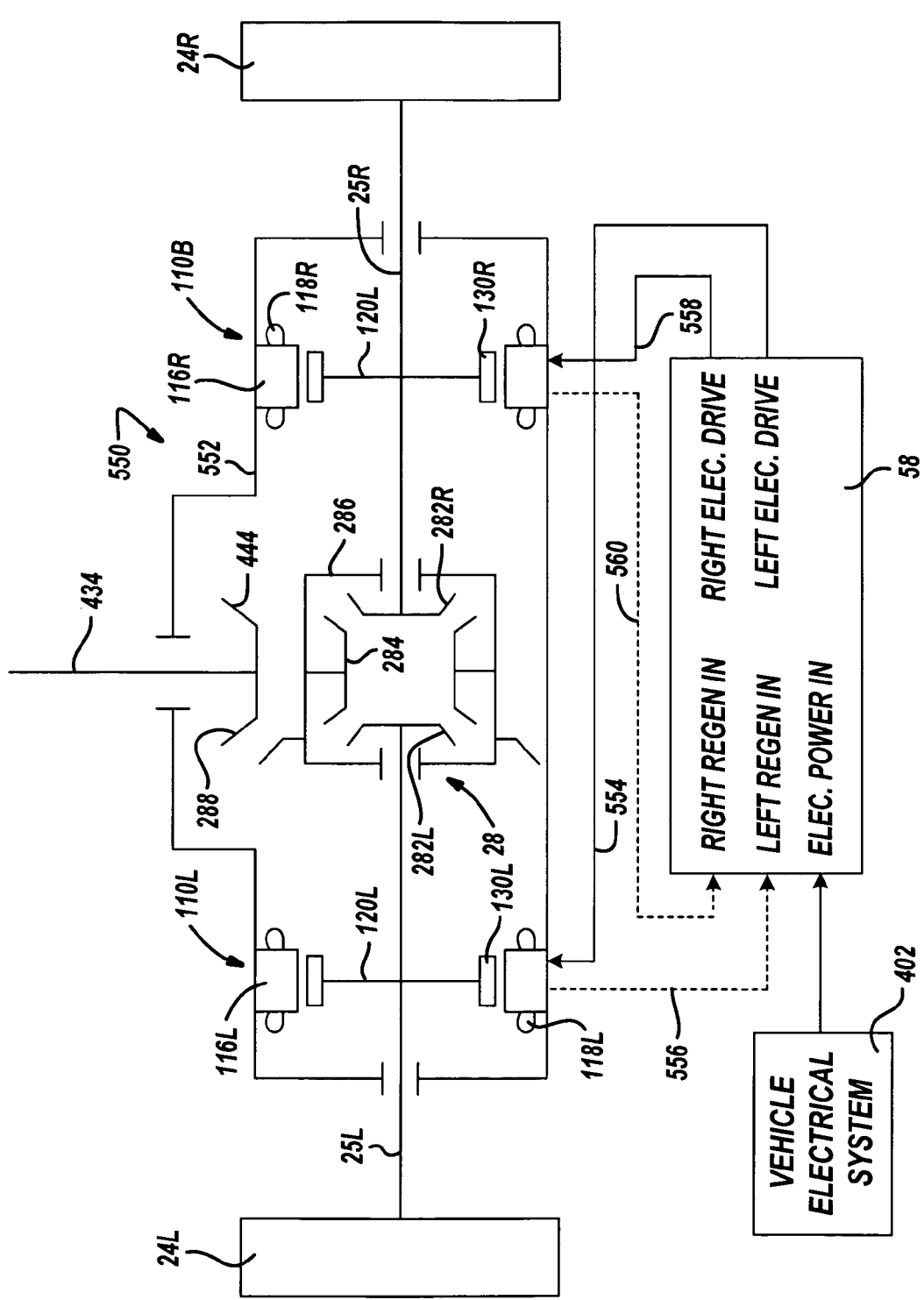
FIG. 20 is a schematic illustration of another embodiment of a drive axle assembly equipped with a torque distributing drive mechanism and yaw control system according to the present invention.

Referring now to FIG. 20, a torque vectoring drive axle 550 is shown to include a differential 28, a first electric motor/brake unit 110L operably associated with left axle shaft 25L, and a second electric motor/brake unit 110R operably associated with right axleshaft 25R. First motor/brake unit 110L is shown to include a coil 118L and stator 116L that are fixed to an axle housing 552 and a rotor 120L fixed for rotation with axleshaft 25L. Rotor 120L has magnets 130L in close proximity to coil 118L. Likewise, second motor/brake unit 110R includes a coil 118R and stator 116R that are fixed to axle housing 552 and a rotor 120R fixed for rotation with axleshaft 25R. Rotor 120R also has magnets 130R positioned in close proximity to coil 118R. Electric power delivered to energize coil 118L is shown by power line 554 while regenerated power from first motor/brake unit 110L is shown by dashed line 556. Similarly, electric power delivered to energize coil 118R is shown by power line 558 while regenerated power from second motor/brake unit 110R is shown by dashed line 560.

In operation, rotors 120L and 120R are driven due to rotation of axleshafts 25L and 25R respectively. Under normal operation, control system 416 keeps both rotors rotating along with their corresponding axleshaft to produce a voltage that is proportional to their rotational speed, such that no power is consumed or generated. However, when a yaw condition dictates individual axleshaft speed control, control system 416 functions to increase the speed of one axleshaft and decrease the speed of the other axleshaft. An increase in speed of one axleshaft is a result of its corresponding motor/brake unit being shifted into its motor mode. Likewise, shifting of the motor/brake unit into its brake mode results in a decrease in rotary speed of the corresponding axleshaft. Differential 28 functions to transmit a corresponding increase or decrease to the other axleshaft such that either motor/brake unit can be independently operated or both can be operated in concert.

A control system for controlling operation of the motor/ brake unit(s) will now be detailed. In general, the control system, and its associated algorithms, is employed to control a brushless dc motor-based clutch actuator assembly. The actuator assembly, in turn, permits modulated control of the torque outputted from its associated clutch assembly. The control system can receive a torque output command from a powertrain control module via a communications link. This command is translated into an electric current level for the brushless motor by the algorithms. A desired current level is maintained in the motor by a feedback control loop, either by sensing the actual motor current or by sensing the actual torque outputted by the clutch assembly. Commutation of the brushless motor drive is also performed by the controller. The motor position is relayed to the controller by the output state of three hall effect sensors embedded in the coil windings. The controller energizes the correct winding pair based on the output from the hall sensors and the desired direction of rotor rotation.

Figure 21:
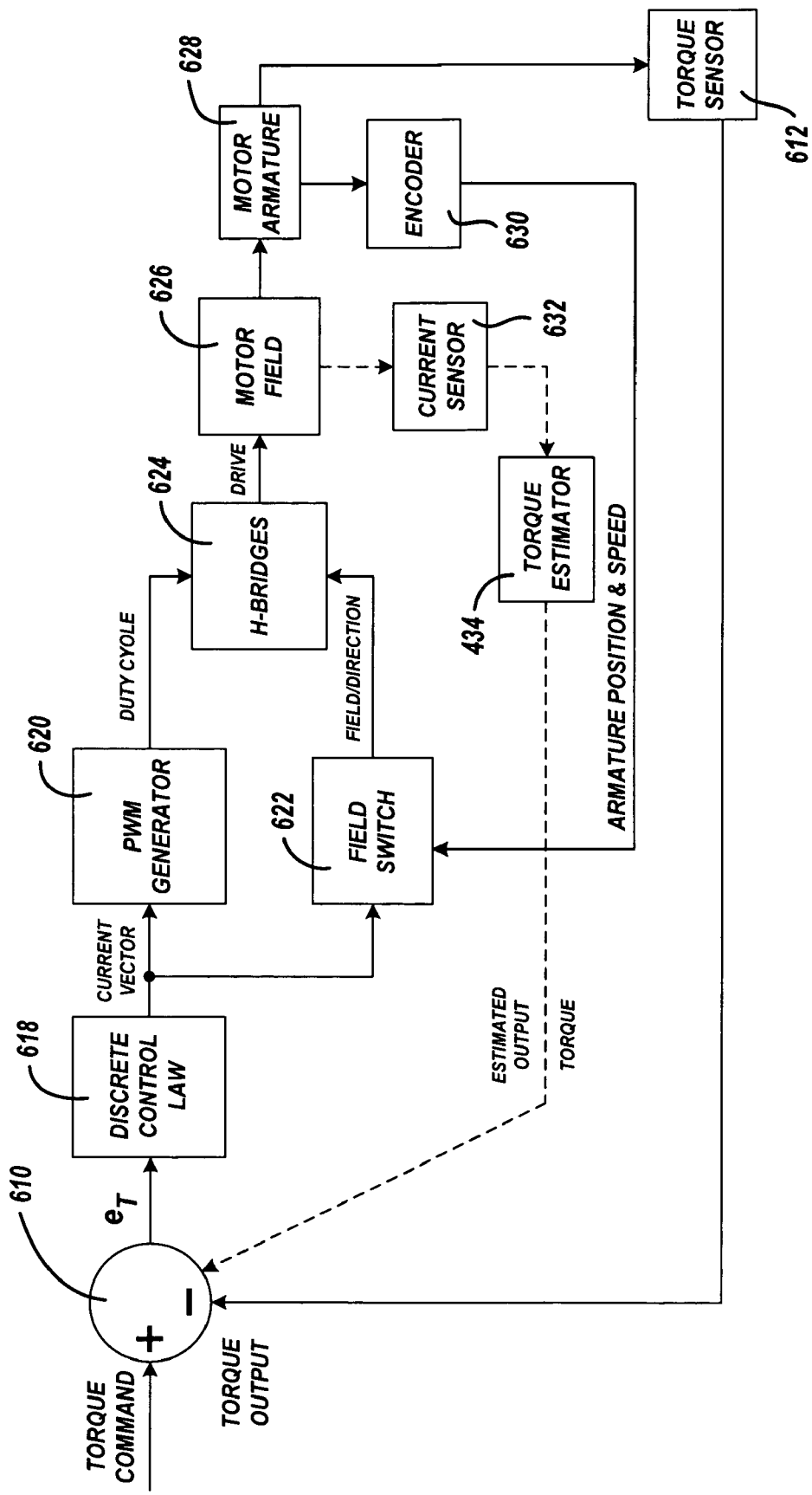
FIG. 21 is a block diagram of a control system for adaptive control of the torque transfer mechanisms of the present invention.

Referring to FIG. 21, an exemplary circuit for the control system is shown. The torque command from controller 58 is delivered to a summing function 610 where the torque command value is compared to the actual torque output value measured by a torque sensor 612 on the output of the clutch assembly. A discrete control law function 618 has as its input the torque error ($e_T$) value outputted from summing function 610. Discrete control law function 618 transforms the torque error ($e_T$) into a signal that commands the subsequent functions to compensate for the error. Specifically, the output signal of control law function 618 commands the magnitude and sign of the clutch engagement force. A PWM (pulse width modulation) generator 620 receives the output signal from discrete control law function 618 and outputs a directly proportional duty cycle pulse train that controls the magnitude of the electric current sent to the coil of the motor/brake unit. A field switch 622 outputs binary signals that control the direction of rotation of the rotor of the motor/brake unit. These direction signals are dictated by the sign of the output signal from control law function 618. Hence, if the current vector is negative, the motor will turn one way, and if the current vector is positive, the motor will turn in the opposite direction. One direction of rotation acts to increase output torque, while the other reduces pressure on the clutch and thereby reduces the output torque.

An H-bridge circuit 624 is configured from four controlled switches (i.e., relay, transistor) that allows control of both the direction and magnitude of electric current through a load (i.e., motor). Two of the four switches are activated to direct current in a given direction. In addition, one of the two remaining devices is modulated so as to control the amount (magnitude) of current.

Motor field block 626 represents the coils and pole pieces of the windings associated with motor/brake units' field. Motor armature 628 is the rotating member of the motor (i.e., the rotor) that also carries the magnet pole pairs. An encoder 630 is a sensor that outputs a signal which identifies the position of the motor armature with respect to the field coils, as well as the speed and direction of motor rotation. This block is necessary for realizations where the motor is electrically commutated (i.e., brushless motors). As is obvious, torque sensor 612 outputs an electrical signal that is proportional to the torque applied to the device to which the sensor is attached. A current sensor 632 outputs an electrical signal that is proportional to the electrical current acting thereon. In the absence of a torque sensor, a torque estimator 634 can be employed to estimate the clutch output torque. It does so by operating mathematically on the current sensor's signal to provided an estimate of the output torque. In practice, this may be a simple linear relationship or a more complex function.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device for use in a motor vehicle having a powertrain and first and second drivelines, comprising:
    an input member driven by the powertrain;
    a first output member coupled to the first driveline;
    a second output member coupled to the second driveline;
    a torque distributing drive mechanism for transmitting drive torque from said input member to said first and second output members and including a differential, a speed changing unit and first and second torque couplings, said differential having an input component driven by said input member and first and second output components respectively driving said first and second output members, said speed changing unit having a first shaft driven by said input component, a second shaft, and a gearset for changing the rotary speed of said second shaft relative to said first shaft, said first torque coupling including a first clutch disposed between said second shaft and said first output component and first electric actuator means for controlling engagement of said first clutch by shifting between a motor mode and a brake mode, and said second torque coupling including a second clutch disposed between said second shaft and said second output component and second electric actuator means for controlling engagement of said second clutch by shifting between a motor mode and a brake mode; and
    a control system for selectively switching said first and second electric actuator means between their respective motor and brake modes.

2. The power transmission device of claim 1 wherein said drive mechanism is operable to establish a first overdrive mode when said first clutch is engaged and said second clutch is released for overdriving said first output component relative to said input component such that said differential causes said second output component to be underdriven relative to said input component.

3. The power transmission device of claim 2 wherein said drive mechanism is operable to establish a second overdrive mode when said first clutch is released and said second clutch is engaged for overdriving said second output component relative to said input component such that said differential causes said first output component to be underdriven relative to said input component.

4. The power transmission device of claim 1 wherein said drive mechanism establishes a locked mode when both of said first and second clutches are engaged.

5. The power transmission device of claim 1 wherein said drive mechanism is operable to establish a first underdrive mode when said first clutch is engaged and said second clutch is released such that said first output component is underdriven relative to said input component and said second output component is overdriven relative to said input component.

6. The power transmission device of claim 5 wherein said drive mechanism is operable to establish a second underdrive mode when said first clutch is released and said second clutch is engaged such that said second output component is underdriven relative to said input component and said first output component is overdriven relative to said input component.

7. The power transmission device of claim 1 wherein said speed changing unit includes an input sun gear driven by said first shaft, an output sun gear driving said second shaft, and speed gears meshing with said input and output sun gears, and wherein said speed gears include a first gear meshed with said input sun gear which is interconnected to a second gear meshed with said output sun gear.

8. The power transmission device of claim 1 wherein said first electric actuator means includes a first conversion mechanism operable to exert a clutch engagement force on said first clutch and a first electric motor operable in each of its motor and brake modes for generating an output torque that is converted by said first conversion mechanism into said clutch engagement force, and wherein said first motor is operable in its brake mode to regenerate electrical power that can be used by said control system to selectively actuate said second electric actuator means.

9. The power transmission device of claim 8 wherein said control system provides electrical power to drive said first motor when operating in its motor mode, and wherein said control system extracts electrical power to brake said first motor when operating in its brake mode.

10. The power transmission device of claim 8 wherein said first conversion mechanism includes first and second components with said first component adapted to move axially in response to relative rotation between said first and second components for applying said clutch engagement force to said first clutch, wherein said first electric motor includes a first rotor that is fixed for rotation with said second component of said first conversion mechanism, wherein said first motor is operable in its motor mode to drive said first rotor so as to cause relative rotation between said first and second components, and wherein said first motor is operable in its brake mode to brake rotation of said first rotor so as to cause relative rotation between said first and second components.

11. The power transmission device of claim 10 wherein said control system functions to control the direction and amount of rotation of said first rotor which, in turn, controls the direction and amount of axial travel of said first component of said first conversion mechanism for varying the magnitude of said clutch engagement force applied to said first clutch.

12. The power transmission device of claim 10 wherein said second electric actuator means includes a second conversion mechanism operable to exert a clutch engagement force on said second clutch and a second electric motor operable in each of its motor and brake modes for generating an output torque that is converted by said second conversion mechanism into said clutch engagement force, and wherein said second motor is operable in its brake mode to regenerate electrical power used by said control system to selectively actuate said first electric motor.

13. The power transmission device of claim 12 wherein said control system provides electrical power to drive said second motor when operating in its motor mode, and wherein said control system extracts electrical power to brake said second motor when operating in its brake mode.

14. The power transmission device of claim 12 wherein said second conversion mechanism includes first and second components with said first component adapted to move axially in response to relative rotation between said first and second components for applying said clutch engagement force to said second clutch, wherein said second electric motor includes a second rotor that is fixed for rotation with said second component of said second conversion mechanism, wherein said second motor is operable in its motor mode to drive said second rotor so as to cause relative rotation between said first and second components, and wherein said second motor is operable in its brake mode to brake rotation of said second rotor so as to cause relative rotation between said first and second components.

15. The power transmission device of claim 14 wherein said control system functions to control the direction and amount of rotation of said second rotor which, in turn, controls the direction and amount of axial travel of said first component of said second conversion mechanism for varying the magnitude of said clutch engagement force.

16. The power transmission device of claim 10 wherein said first clutch includes a first hub fixed for rotation with said first output component, a drum fixed for rotation with said second shaft, and a first clutch pack of interleaved clutch plates operably disposed between said first hub and said drum, wherein said first component of said first conversion mechanism is a first screw and said second component is a first nut engaging said first screw, and wherein said first rotor is fixed to said first nut such that actuation of said first motor in either of its motor and brake modes causes said first nut to rotate relative to said first screw for causing said first screw to move axially relative to said first clutch pack.

17. The power transmission device of claim 16 wherein said second clutch includes a second hub fixed for rotation with said second output component, and a clutch pack of interleaved clutch plates operably disposed between said second hub and said drum, wherein said first component of said second conversion mechanism is a second screw and said second component is a second nut engaging said second screw, and wherein said second rotor is fixed to said second nut such that actuation of said second motor in either of its motor and brake modes causes said second nut to rotate relative to said second screw for causing said second screw to move axially relative to said second clutch pack.

18. A power transmission device for use in a motor vehicle having a powertrain and first and second drivelines, comprising:
an input member driven by the powertrain;
a first output member coupled to the first driveline;
a second output member coupled to the second driveline;
a torque distributing drive mechanism for transmitting drive torque from said input member to said first and second output members and including a differential, a speed changing unit and first and second torque couplings, said differential having an input component driven by said input member and first and second output components respectively driving said first and second output members, said speed changing unit having a first shaft driven by said input component, a second shaft, and a gearset for changing the rotary speed of said second shaft relative to said first shaft, said first torque coupling including a first clutch disposed between said second shaft and said first output component, a first operator for exerting a clutch engagement force on said first clutch, and first electric motor/brake unit for controlling movement of said first operator relative to said first clutch and which is operable in a motor mode and a brake mode, and said second torque coupling including a second clutch disposed between said second shaft and said second output component, a second operator for exerting a clutch engagement force on said second clutch, and second electric motor/brake unit for controlling movement of said second operator relative to said second clutch and which is operable in a motor mode and a brake mode; and a control system for selectively switching said first and second electric motor/brake units between their respective motor and brake modes.

19. The power transmission device of claim 18 wherein said drive mechanism is operable to establish a first overdrive mode when said first clutch is engaged and said second clutch is released for overdriving said first output component relative to said input component such that said differential causes said second output component to be underdriven relative to said input component, wherein said drive mechanism is further operable to establish a second overdrive mode when said first clutch is released and said second clutch is engaged for overdriving said second output component relative to said input component such that said differential causes said first output component to be underdriven relative to said input component, and wherein said drive mechanism establishes a locked mode when both of said first and second clutches are engaged.

20. The power transmission device of claim 18 wherein said drive mechanism is operable to establish a first underdrive mode when said first clutch is engaged and said second clutch is released such that said first output component is underdriven relative to said input component and said second output component is overdriven relative to said input component, and wherein said drive mechanism is operable to establish a second underdrive mode when said first clutch is released and said second clutch is engaged such that said second output component is underdriven relative to said input component and said first output component is overdriven relative to said input component.

21. The power transmission device of claim 18 wherein said first electric motor/brake unit is operable in each of its motor and brake modes for generating an output torque that is converted by said first operator into said clutch engagement force applied to said first clutch, and wherein said first motor/brake unit is operable in its brake mode to regenerate electrical power that is used by said control system to actuate said second electric motor/brake unit.

22. The power transmission device of claim 21 wherein said second electric motor/brake unit is operable in each of its motor and brake modes for generating an output torque that is converted by said second operator into said clutch engagement force applied to said second clutch, and wherein said second motor/brake unit is operable in its brake mode to regenerate electrical power that is used by said control system to actuate said first motor/brake unit.

23. The power transmission device of claim 18 wherein said first operator includes first and second components with said first component adapted to move axially in response to relative rotation between said first and second components for applying said clutch engagement force to said first clutch, wherein said first electric motor/brake unit includes a first rotor that is fixed for rotation with said second component of said first operator, and wherein said first motor/brake unit is operable in its motor mode to drive said first rotor so as to cause relative rotation between said first and second components and is further operable in its brake mode to brake rotation of said first rotor so as to cause relative rotation between said first and second components.

24. The power transmission device of claim 23 wherein said control system functions to control the direction and amount of rotation of said first rotor which, in turn, controls the direction and amount of axial travel of said first component of said first operator for varying the magnitude of said clutch engagement force applied to said first clutch.

25. The power transmission device of claim 24 wherein said second operator includes first and second components with said first component adapted to move axially in response to relative rotation between said first and second components for applying said clutch engagement force to said second clutch, wherein said second electric motor/brake unit includes a second rotor that is fixed for rotation with said second component of said second operator, and wherein said second motor/brake unit is operable in its motor mode to drive said second rotor so as to cause relative rotation between said first and second components and is further operable in its brake mode to brake rotation of said second rotor so as to cause relative rotation between said first and second components.

26. The power transmission device of claim 25 wherein said control system functions to control the direction and amount of rotation of said second rotor which, in turn, controls the direction and amount of axial travel of said first component of said second operator for varying the magnitude of said clutch engagement force applied to said second clutch.

27. The power transmission device of claim 25 wherein said first clutch includes a first hub fixed for rotation with said first output component, a drum fixed for rotation with said second shaft, and a first clutch pack operably disposed between said first hub and said drum, wherein said first component of said first operator is a first screw and said second component is a first nut engaging said first screw, and wherein said first rotor is fixed to said first nut such that actuation of said first motor/brake unit in either of its motor and brake modes causes said first nut to rotate relative to said first screw for causing said first screw to move axially relative to said first clutch pack.

28. The power transmission device of claim 27 wherein said second clutch includes a second hub fixed for rotation with said second output component and a second clutch pack operably disposed between said second hub and said drum, wherein said first component of said second operator is a second screw and said second component is a second nut engaging said second screw, and wherein said second rotor is fixed to said second nut such that actuation of said second motor/brake unit in either of its motor and brake modes causes said second nut to rotate relative to said second screw for causing said second screw to move axially relative to said second clutch pack.

29. A drive axle assembly for use in a motor vehicle having a powertrain and first and second wheels, comprising:

an input shaft driven by the powertrain;
a first axleshaft coupled to the first wheel;
a second axleshaft coupled to the second wheel;
a torque distributing drive mechanism for transmitting drive torque from said input shaft to said first and second axleshafts and including a differential, a speed changing unit and first and second torque couplings, said differential having an input component driven by said input shaft and first and second output components respectively driving said first and second axleshafts, said speed changing unit having a first shaft driven by said input shaft, a second shaft, and a gearset for changing the rotary speed of said second shaft relative to said first shaft, said first torque coupling including a first clutch disposed between said second shaft and said first output component and first electric actuator means for controlling engagement of said first clutch by shifting between a motor mode and a brake mode, and said second coupling including a second clutch disposed between said second shaft and said second output component and second electric actuator means for controlling engagement of said second clutch by shifting between a motor mode and a brake mode; and a control system for selectively switching said first and second electric actuator means between their respective motor and brake modes.

30. The drive axle assembly of claim 29 wherein said drive mechanism is operable to establish a first overdrive mode when said first clutch is engaged and said second clutch is released for overdriving said first output component relative to said input component such that said differential causes said second output component to be underdriven relative to said input component, and wherein said drive mechanism is operable to establish a second overdrive mode when said first clutch is released and said second clutch is engaged for overdriving said second output component relative to said input component such that said differential causes said first output component to be underdriven relative to said input component.

31. The drive axle assembly of claim 29 wherein said drive mechanism establishes a locked mode when both of said first and second clutches are engaged.

32. The drive axle assembly of claim 29 wherein said drive mechanism is operable to establish a first underdrive mode when said first clutch is engaged and said second clutch is released such that said first output component is underdriven relative to said input component and said second output component is overdriven relative to said input component, and wherein said drive mechanism is operable to establish a second underdrive mode when said first clutch is released and said second clutch is engaged such that said second output component is underdriven relative to said input component and said first output component is overdriven relative to said input component.

33. The drive axle assembly of claim 29 wherein said first electric actuator means includes a first electric motor that is operable in each of its motor and brake modes for generating an output torque that is converted by a first conversion mechanism into a clutch engagement force applied to said first clutch, and wherein said first motor is operable in its brake mode to regenerate electrical power that can be used by said control system to selectively actuate said second electric actuator means.

34. The drive axle assembly of claim 33 wherein said control system provides electrical power to drive said first motor when operating in its motor mode, and wherein said control system extracts electrical power to brake said first motor when operating in its brake mode.

35. The drive axle assembly of claim 33 wherein said first conversion mechanism includes first and second components with said first component adapted to move axially in response to relative rotation between said first and second components for applying said clutch engagement force to said first clutch, wherein said first electric motor includes a first rotor that is fixed for rotation with said second component of said first conversion mechanism, and wherein said first motor is operable in its motor mode to drive said first rotor so as to cause relative rotation between said first and second components and is further operable in its brake mode to brake rotation of said first rotor so as to cause relative rotation between said first and second components.

36. The drive axle assembly of claim 35 wherein said control system functions to control the direction and amount of rotation of said first rotor which, in turn, controls the direction and amount of axial travel of said first component of said first conversion mechanism for varying the magnitude of said clutch engagement force.

37. The drive axle assembly of claim 35 wherein said second electric actuator means includes a second electric motor that is operable in each of its motor and brake modes for generating an output torque that is converted by a second conversion mechanism into a clutch engagement force applied to said second clutch, and wherein said second, motor is operable in its brake mode to regenerate electrical power used by said control system to selectively actuate said first electric motor.

38. The drive axle assembly of claim 37 wherein said second conversion mechanism includes first and second components with said first component adapted to move axially in response to relative rotation between said first and second components for applying said clutch engagement force to said second clutch, wherein said second electric motor includes a second rotor that is fixed for rotation with said second component of said second conversion mechanism, and wherein said second motor is operable in its motor mode to drive said second rotor so as to cause relative rotation between said first and second components and is further operable in its brake mode to brake rotation of said second rotor so as to cause relative rotation between said first and second components.

39. The drive axle assembly of claim 38 wherein said control system functions to control the direction and amount of rotation of said second rotor which, in turn, controls the direction and amount of axial travel of said first component of said second conversion mechanism for varying the magnitude of said clutch engagement force applied to said second clutch.

40. The drive axle assembly of claim 38 wherein said first clutch includes a first hub fixed for rotation with said second output component, a drum fixed for rotation with said second shaft, and a first clutch pack operably disposed between said first hub and said drum, and wherein said second clutch includes a second hub fixed for rotation with said second output component and a second clutch pack disposed between said second hub and said drum.

* * * * *